(12) United States Patent
Senel et al.

(10) Patent No.: US 12,287,305 B2
(45) Date of Patent: Apr. 29, 2025

(54) MICROFLUIDIC SENSING DEVICES

(71) Applicant: The Regents of the University of California, Oakland, CA (US)

(72) Inventors: Mehmet Senel, Irvine, CA (US); Amal Alachkar, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/959,473

(22) Filed: Oct. 4, 2022

(65) Prior Publication Data

US 2023/0109643 A1  Apr. 6, 2023

Related U.S. Application Data

(60) Provisional application No. 63/252,904, filed on Oct. 6, 2021.

(51) Int. Cl.
| | | |
|---|---|---|
| *G01N 27/327* | (2006.01) | |
| *B33Y 10/00* | (2015.01) | |
| *B33Y 80/00* | (2015.01) | |

(52) U.S. Cl.
CPC .......... *G01N 27/3271* (2013.01); *B33Y 80/00* (2014.12); *B33Y 10/00* (2014.12)

(58) Field of Classification Search
CPC .......... G01N 27/3271; G01N 27/3272; G01N 27/3273; G01N 27/3275; G01N 27/333;
(Continued)

(56) References Cited

U.S. PATENT DOCUMENTS

2006/0058602 A1 * 3/2006 Kwiatkowski ................ 600/407
2014/0251826 A1 * 9/2014 Koelker ............. G01N 27/3271
205/777.5

FOREIGN PATENT DOCUMENTS

WO    WO-2008038274 A1 *  4/2008  ......... A61B 5/14525
WO    WO-2019169237 A1 *  9/2019  ............. B29C 65/48

OTHER PUBLICATIONS

Goh, W.H. Goh & M. Hashimoto, Fabrication of 3D Microfluidic Channels and In-Channel Features Using 3D Printed, Water-Soluble Sacrificial Mold, 2018 Macromol. Mater. Eng. 1700484 (Year: 2018).*

(Continued)

*Primary Examiner* — Robert C Boyle
*Assistant Examiner* — Patrick Loen Benitez
(74) *Attorney, Agent, or Firm* — Chong IP Law Group

(57) ABSTRACT

Microfluidic sensing devices utilizing microfluidic sensing electrodes are provided. In one embodiment, a method for fabrication of a microfluidic sensing electrode device for detection of analyte(s) in a fluid is provided, the method comprising: generating a chamber comprising: a tube hole configured to receive a tube, wherein the tube hole extends from a first end of the chamber to a second end of the chamber; and a plurality of electrode holes configured to receive a plurality of electrodes, wherein each of the plurality of electrode holes is in contact with the tube hole; inserting the tube into the tube hole; inserting the plurality of electrodes into the plurality of electrode holes; applying a resin to the chamber; removing the tube from the tube hole, wherein removing the tube from the tube hole exposes a sensing zone that allows the plurality of electrodes to be in contact with the fluid.

20 Claims, 31 Drawing Sheets

(58) Field of Classification Search
CPC ...... G01N 27/26; G01N 27/327; G01N 27/30; G01N 27/28; B33Y 80/00
See application file for complete search history.

(56) References Cited

OTHER PUBLICATIONS

P. Jusková et al., Detection of Electrochemiluminescence from Floating Metal Platelets in Suspension, 13 Lab Chip 781-784 (2013). (Year: 2013).*
Q. Xu et al., Coaxial Nozzle-assisted 3D Printing with in-situ UV LED Curing for Microfluidic Connectors, 2019 IEEE ICEPT 19576003, p. 1-4. (Year: 2019).*
C.M.B. Ho et al., 3D printed microfluidics for biological applications, 15 Lab Chip 3627 (2015) (Year: 2015).*

* cited by examiner

MICROFLUIDIC SENSING DEVICES

CROSS-REFERENCE TO RELATED APPLICATION

The current application claims priority to U.S. Provisional Patent Application No. 63/252,904, filed on Oct. 6, 2021, the disclosure of which is incorporated herein by reference.

FIELD OF THE INVENTION

The present invention generally relates to microfluidics and more specifically to methods, systems, and devices for microfluidic sensing.

BACKGROUND

Microfluidics generally describes the control and manipulation of fluids that are geometrically constrained to a small scale at which surface forces dominate volumetric forces. Typically, microfluidic systems may transport, mix, separate, or otherwise process fluids.

Three-dimensional (3D) printing refers to the construction of a 3D object from a computer-aided design (CAD) model or a digital 3D model. 3D printing may include a variety of processes in which material is deposited, joined or solidified under computer control. Typically, the material used in the 3D process may be added together layer by layer in printing of the 3D object.

SUMMARY OF THE INVENTION

The various embodiments of the present microfluidic sensing devices contain several features, no single one of which is solely responsible for their desirable attributes. Without limiting the scope of the present embodiments, their more prominent features will now be discussed below. In particular, the present microfluidic sensing devices will be discussed in the context of sensing and/or detection of particular analyte(s) (e.g., Clozapine, dopamine, etc.). However, the use of particular analyte(s) are merely exemplary and various other substance and/or or chemical constitutes may be sensed and/or analyzed using microfluidic sensing devices as appropriate to the requirements of a specific application in accordance with various embodiments of the invention. Further, the use of fabrication methods, including, but not limited to, the order of fabrication, are also merely exemplary and various fabrication methods may be utilized as appropriate to the requirements of a specific application in accordance with various embodiments of the invention. After considering this discussion, and particularly after reading the section entitled "Detailed Description," one will understand how the features of the present embodiments provide the advantages described here.

One aspect of the present embodiments includes the realization that additive manufacturing has become increasingly popular due to its simplicity and ability to build up prototypes with high precision of microstructures and microchannels formation. Different 3D printing methods may be used to enable the application of this technology in medical, pharmaceutical, electroanalytical, and food applications, etc. Further, printing technology may be used to miniaturize and mass-produce sensors in-field measurement for their cost-effective and customized use. For example, fused deposition modeling (FDM) is a viable 3D-printing method for electroanalytical applications. Various types of 3D printed electrochemical cells have been fabricated by this method. For example, the design and fabrication of miniaturized microfluidic enzymatic biofuel cell (M-EBFC) using rapid prototyping 3D printing techniques have been demonstrated. As further described below, the Pencil Graphite Electrodes (PGEs) may be used as the electrode material. These PGEs successively encapsulated into Y-shaped microchannel, fabricated using a commercial 3D Printer. It has been shown that fabricating electrochemical cell-on-a-chip device entirely by 3D printing is possible. The device was 3D-printed via a single-step process using a dual extruder 3D printer.

Another aspect of the present embodiments includes the realization that 3D printing methods have also been used for the fabrication of flow cells, which may be used to increase mass transport of reactants to an electrode surface. It has an advantage to rapidly prototype and test a wide variety of parameters that impact sensitivity (e.g., channel dimensions, inlet/outlet spacing, electrode placement). A fluidic electrochemical sensor fabricated with an additive manufacturing approach based on the combination of fused filament fabrication may include a miniaturized three electrode electrochemical detection unit integrated into a polymer-based monolithic fluidic platform. A challenge in preparing ready-to-use FDM based 3D printed electrochemical devices in a single step is to ensure that the electrodes are sufficiently activated to perform well compared with other electrode materials. Also, the resolution of the FDM-based 3D printing method may not capable of forming microstructures.

Another aspect of the present embodiments includes the realization that among the 3D printing methods, stereolithography (SLA) 3D printing has become popular due to its ability to produce high-accuracy, isotropic, and watertight prototypes and parts in a range of advanced materials with fine features and smooth surface finish. SLA 3D printing may be based on the UV curing of the resin, which may be controlled by an optic arrangement for the layer-by-layer deposition. Acrylate-based resins have been used for fabrication of 3D printed fluidic devices. After printing, electrodes materials may be incorporated into 3D-printed fluidic devices to obtain a sensor. A fluidic device with ports for incorporating electrodes for electrochemiluminescence measurements may be prepared using a desktop three-dimensional (3D) printer based on stereolithography. The device may include 0.5 mm pencil graphite rods and 0.5 mm silver wires inserted into commercially available threaded fittings. However, the electrodes were not directly adapted in the 3D printed fluidic device. Instead, the electrodes were adapted using a threaded fitting and connected to the device.

Another aspect of the present embodiments includes the realization that the low cost and simple fabrication of microflow injection cells (pFEC) may be important for expanding the applications of microfluidic sensing devices in the analysis of small volume samples. Moreover, the reduction of the consumption of reagents is a worldwide trend in analytical chemistry. The pFECs may perform analysis in a "greener" way with reduced toxic waste generation. In addition, the electrode material may be considered for the measurement performance of a biosensor. Pencil graphite electrodes (PGEs) have attracted attention in recent decades due to their comparable electrical properties, low cost, availability, disposability, ease of renewal of surface, and low background current. PGEs have been used for the fabrication of different types of electrochemical sensors instead of other carbon electrodes. The type of lead and pretreatment of the surface should be considered for the analytical performance of the PGEs.

Another aspect of the present embodiments includes the realization that monitoring drugs in the biological systems may be of importance for improving efficacy and/or minimizing toxicity in patient care. For example, Clozapine (Clz) is an effective atypical antipsychotic drug approved for the treatment of schizophrenia. However, the use of Clz in the treatment of schizophrenia has been vastly limited due to the reluctance of physicians to prescribe Clz for its fatally toxic effects in a small proportion of patients. Broader use of Clz could benefit both individuals and society, and therefore, rapid and efficient methods for monitoring of Clz in patients' serum may help clinicians to rapidly adjust the optimum dosage and therefore prevent the toxic effects. Currently, several analytical methods have been used for the measurement of Clz in pharmaceutical and biological fluids, including capillary zone electrophoresis, high-performance liquid chromatography, colorimetry, mass spectrometry, and spectrophotometry. However, most of these methods are time-consuming, and require moderately costly equipment, several days turnaround, pretreatment steps, and advanced technical expertise. Hence, there is a need to develop a simple and fast analytical method for the measurement of the Clz in a biological sample.

Another aspect of the invention includes the realization that electroanalytical methods may be good alternatives to existing benchtop techniques for the detection of most of the electroactive compounds due to their low cost, high sensitivity, and simple application. In this respect, a simple electrochemical method may be designed for measuring the level of the Clz due to its intrinsic electrochemical activity. Several studies have been focused on the development of an electrochemical sensor for Clz detection such as electrochemically pretreated glassy carbon electrode, multiwall carbon nanotubes (MWCNTs)/new coccine (NC) doped polypyrrole, $Fe_3O_4$, Ala, and palladium composite coated glassy carbon electrode and reduced-graphene oxide-modified microelectrode.

In a first aspect, a method for fabrication of a microfluidic sensing electrode (μFSE) device for detection of analyte(s) in a fluid is provided, the method comprising: generating a chamber comprising: a tube hole configured to receive a tube, wherein the tube hole extends from a first end of the chamber to a second end of the chamber; and a plurality of electrode holes configured to receive a plurality of electrodes, wherein each of the plurality of electrode holes is in contact with the tube hole; inserting the tube into the tube hole; inserting the plurality of electrodes into the plurality of electrode holes; applying a resin to the chamber; and removing the tube from the tube hole, wherein removing the tube from the tube hole exposes a sensing zone that allows the plurality of electrodes to be in contact with the fluid.

In an embodiment of the first aspect, the method further comprises curing the resin before removing the tube from the tube hole.

In another embodiment of the first aspect, the resin is a clear epoxy resin.

In another embodiment of the first aspect, the chamber further comprises a first resin fill zone located at the first end of the chamber and wherein the resin is applied via the first resin fill zone.

In another embodiment of the first aspect, the chamber further comprises a second resin fill zone located at the second end of the chamber and wherein the resin is applied via the second resin fill zone.

In another embodiment of the first aspect, the method further comprises opening a first connection hole on the first end of the chamber.

In another embodiment of the first aspect, the method further comprises inserting a first connection tube into the first connection hole.

In another embodiment of the first aspect, the method further comprises opening a second connection hole on the second end of the chamber.

In another embodiment of the first aspect, the method further comprises inserting a second connection tube into the second connection hole.

In another embodiment of the first aspect, the first connection tube and the second connection tube have inner diameters of 100 μm and outer diameters of 400 μm.

In another embodiment of the first aspect, the tube has an inner diameter of 100 μm and an outer diameter of 400 μm.

In another embodiment of the first aspect, the sensing zone has an inner diameter of 400 μm.

In another embodiment of the first aspect, the μFSE device comprises an inner electroactive sensor volume of ~0.5 μL.

In another embodiment of the first aspect, the chamber is generated using a 3D printing process.

In another embodiment of the first aspect, the 3D printing process is 3D sterolithography.

In another embodiment of the first aspect, the plurality of electrode holes comprises a first electrode hole, a second electrode hole, and a third electrode hole.

In another embodiment of the first aspect, the plurality of electrodes comprises a reference electrode, a working electrode, and a counter electrode.

In another embodiment of the first aspect, the plurality of electrodes comprises three pencil graphite rods.

In another embodiment of the first aspect, the plurality of electrodes comprises three metal rods.

In another embodiment of the first aspect, the three metal rods comprises a first rod made with Au, a second rod made with Pt, and a third rod made with Ag.

BRIEF DESCRIPTION OF THE DRAWINGS

The various embodiments of the present microfluidic sensing devices now will be discussed in detail with an emphasis on highlighting the advantageous features. These embodiments depict the novel and non-obvious features of microfluidic sensing devices shown in the accompanying drawings, which are for illustrative purposes only. These drawings include the following figures.

DETAILED DESCRIPTION OF THE DRAWINGS

Figure 1A:
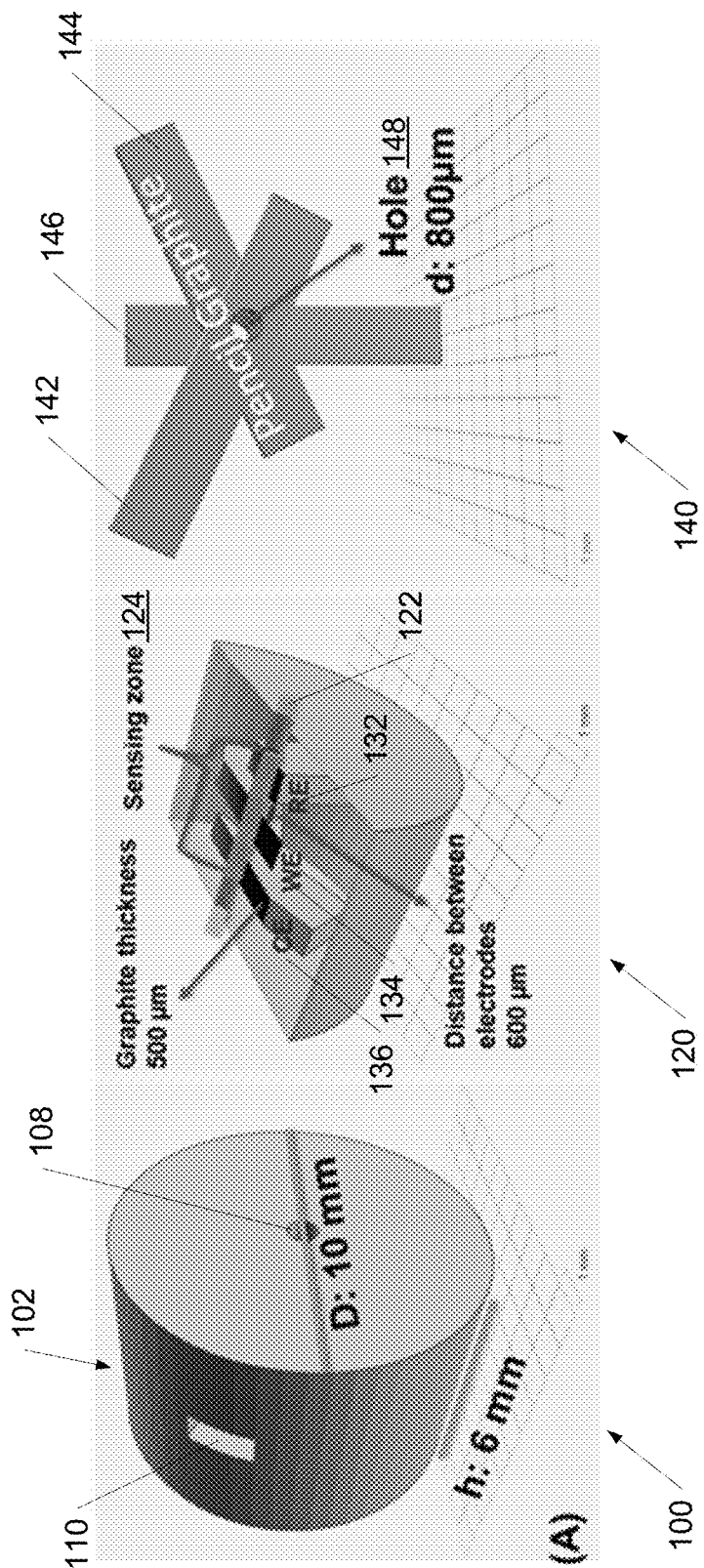
FIG. 1A is a 3D model of an electrochemical cell in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Turning now to the drawings, microfluidic sensing devices (may also be referred to as "microfluidic sensing electrode devices" and/or "microfluidic devices") utilizing microfluidic sensing electrodes (μFSEs) are provided. In many embodiments, microfluidic sensing devices may include a lab-in-a-pencil graphite microfluidic sensing electrodes (may also be referred to as pencil graphite electrodes (PGEs)). In some embodiments, μFSEs may be fabricated for real-time or near-real time flow measurements (e.g., injection flow measurements) of any substance, such as, but not limited to, the antipsychotic drug Clozapine (Clz). In some embodiments, simple, low-cost, and reusable μFSEs may be obtained using 3D printing of a microfluidic chamber integrated with flat pencil graphite without the need to utilize complex technologies, as further described below. In various embodiments, the μFSEs may have tubular geometry with various diameters (e.g., 800 μm diameter), where the solution continuously flows in the holes of the flat pencil graphite electrodes. Under optimized conditions, the present embodiments may offer fast and effective detection (e.g., Clz detection) with good analytical features. In some embodiments, a linear calibration curve in the range of 0.5 to 10 μM Clz was obtained with good sensitivity (0.01275 μA/μM) and detection limit (24 nM). The present embodiments demonstrate the applicability of a lab-fabricated microfluidic electrochemical devices as illustrated by monitoring Clz in serum samples at low concentrations.

In addition, microfluidic sensing devices may include cartridge μFSE devices and syringe-based μFSE devices, as further described below. In some embodiments, μFSEs may be fabricated for real-time and/or near real-time flow measurements (e.g., injection flow) of analyte(s) in a small-volume fluid. In many embodiments, simple, low-cost, and reusable μFSEs may be obtained by using 3D printing of a microfluidic chamber integrated with electrodes such as, but not limited to, electrical conducting metals (e.g., Au, Pt, Ag, etc.) without the need to utilize complex technologies. In a variety of embodiments, µFSEs may have a tubular geometry with varying diameters (e.g., a 400 µm diameter), where the solution continuously flows in the holes of the microfluidic device. Materials, fabrication, and flow injection analysis procedures for µFSEs in accordance with embodiments of the invention are discussed further below.

EXPERIMENTAL SECTION

Microfluidic sensing devices may include 3-electrode integrated micro-volume 3D-printed sensing device (may also be referred to as a "platform") for low-volume flow injection analysis. As further described below, exemplary tubular pencil graphite based microfluidic sensing devices are provided. A typical microfluidic device has microchannels ranging from submicron to few millimeters. The dimensions of the various microfluidic devices as provided herein may include various dimensions based on design considerations. For example, drilling limitations may determine dimensions (e.g., 800 µm). The main body of the microfluidic device may be entirely fabricated by 3D printing using a 3D printer (e.g., an SLA 3D printer). After printing, PGEs may be immediately and/or directly adapted into the cavities on the lateral edge of the device without using any adhesive. For illustrative purposes, electrochemical sensing application of the present embodiments are described (e.g., the determination of Clz by amperometric flow injection analysis). For example, to demonstrate the platform's applicability for real sample analysis, the device was used to measure the concentration of Clz in spiked human serum samples.

Figure 1B:
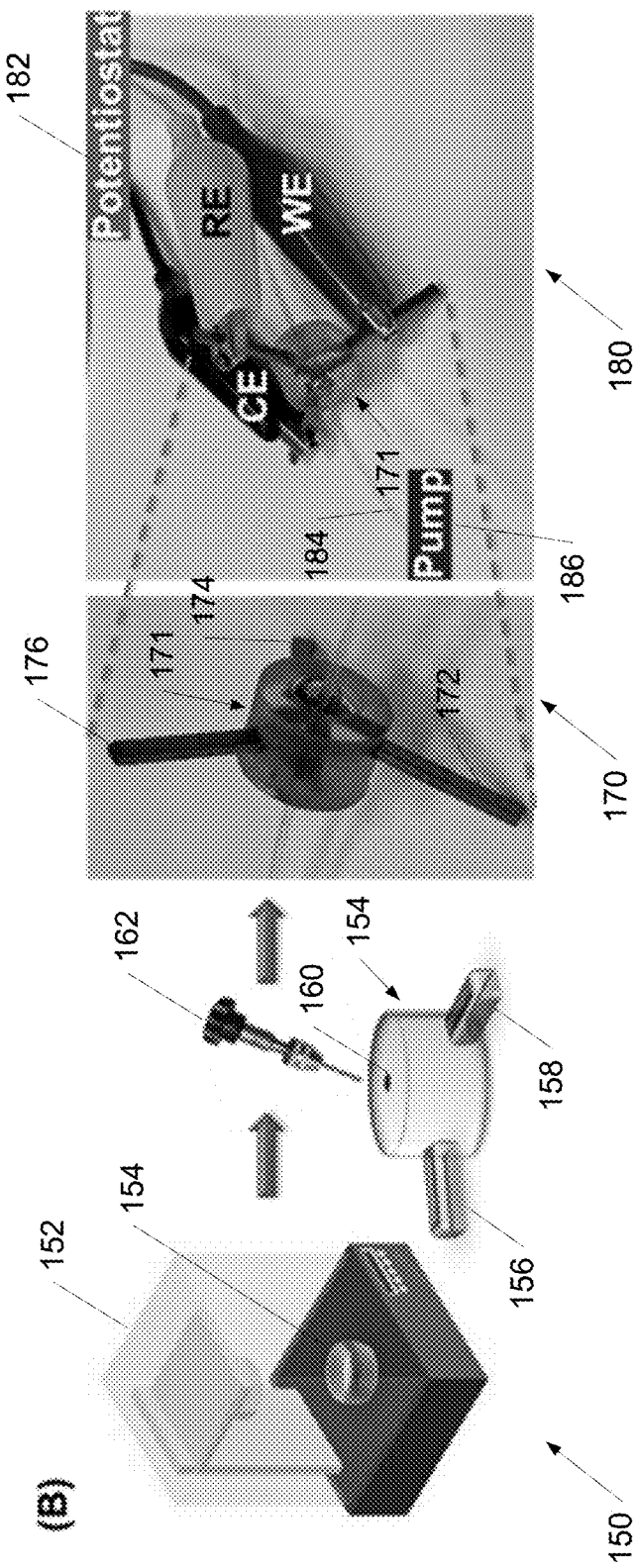
FIG. 1B illustrates a scheme of a 3D printed microfluidic cell fabrication and a lab-in-a-pencil graphite microfluidic sensing electrode ("μFSE") in accordance with an embodiment of the invention.

Materials and Instrumentation—In some embodiments, Clz, glucose, Nafion, uric acid, ascorbic acid, sodium chloride, and potassium chloride may be utilized. Further, human serum may be used as a real sample. All chemicals utilized were of analytical grade and were used without further purification, and all solutions were prepared with double-distilled water (ddH$_2$O) unless stated otherwise. Refill for Flat Lead Mechanical Pencil 2B (width: 900 µm, height: 1750 µm, length: 60 mm), Morning Glory (USA), was utilized to hold the pencil leads. PGE may be prepared by cutting a commercial lead into 10 mm long sticks. A scanning electron microscope (SEM) may be used to observe the surface of the samples. For SEM, pieces of the samples may be mounted on stubs and coated with gold using a sputter coater. SEM micrographs of the samples may be taken using a scanning electron microscope (e.g., Tescan GAIA3 SEM-FIB) and the pieces of the drilled part of the PGEs may be mounted on stubs.

µFSE Sensor Fabrication—Fabrication of an µFSE in accordance with an embodiment of the invention is shown in FIGS. 1A-B. For example, a 3D model of an electrochemical cell in accordance with an embodiment of the invention is shown in FIG. 1A. In FIG. 1A, image 100 provides a perspective view of the exterior of the electrochemical cell 102 (may also be referred to as a "microfluidic chamber" or "chamber"). In some embodiments, the electrochemical cell 102 may have a tubular geometry with a diameter of 10 mm and a height of 6 mm. Further, the electrochemical cell 102 may include a tube hole 108 for creating a sensing zone 124, as further described below. In various embodiments, the electrochemical cell 102 may also include one or more electrode holes 110 for receiving electrodes such as, but not limited to, pencil graphite electrodes (PGEs).

In reference to FIG. 1A, image 120 provides a cross sectional view of the electrochemical cell 102 after insertion and removal of a tube 122 into the tube hole 108 and insertion of the PGEs into the electrode holes into the chamber. In various embodiments, the electrochemical cell may include any number of electrode holes for receiving a corresponding number of electrodes. For example, the electrochemical cell 102 may include three electrode holes for receiving three PGEs. In many embodiments, after removal of the tube, the electrodes may provide a sensing zone 124 for measuring and/or detecting analyte(s) in a solution. In some embodiments, a first PGE 132 may be a reference electrode (RE), a second PGE 134 may be a working electrode (WE), and the third PGE 136 may be a counter electrode (CE). In some embodiments, the PGEs 132, 134, 136, may be separated by a distance such as, but not limited to, a distance of 600 µm. In some embodiments, each of the PGEs 132, 134, 136 may each have a graphite thickness such as, but not limited to, a graphite thickness of 500 µm.

In further reference to FIG. 1A, image 140 provides a front view of pencil graphite rods 142, 144, 146. In many embodiments, the pencil graphite rods (e.g., pencil graphite rods 142, 144, 146) may be utilized to construct the PGEs (e.g., PGEs 132, 134, 136). In various embodiments, the pencil graphite rods 142, 144, 146 (and/or the PGEs 132, 134, 136) may be arranged with a hole 148 such that the hole 148 is present in each of the pencil graphite rods 142, 144, 146 (and/or the PGEs 132, 134, 136). For example, in some embodiments, the hole 148 may have a diameter such as, but not limited to, a diameter of 800 µm. In some embodiments, when the electrodes are inserted into the electrochemical cell 102, the pencil graphite rods 142, 144, 146 (and/or the PGEs 132, 134, 136) may be positioned such that only one end of each pencil graphite rods 142, 144, 146 (and/or the PGEs 132, 134, 136) extends outside of the electrochemical cell 102 via the electrode holes. In some embodiments, the opposite end of each pencil graphite rods 142, 144, 146 (and/or PGEs 132, 134, 136) may be embedded within the electrochemical cell 102.

In further reference to FIG. 1A, the 3D model of the electrochemical cell 102 was used during the clozapine measurements with the positions of the electrodes as provided. Scheme showing the layout of sensing electrodes and fluidic channels and details about the geometry of experimental cell is shown. In many embodiments, the fabrication process of the µFSE may include various steps (e.g., the three steps), as further described below. In some embodiments, the µFSE may be designed using a computer-aided design program such as, but not limited to, SolidWorks® software (Dassault Systemes, France), as shown in FIG. 1A. In some embodiments, an inner diameter of the sensing channel of the device may be 800 µm, and an inner electroactive sensor volume may be calculated as ~3.14 µL. The CAD file (e.g., in .STL format) may be opened with a 3D printer software (e.g., the Anycubic Photon 3D SLA printer software) to determine various printing conditions (e.g., layer thickness: 0.03 mm, with an exposure time of 8 s, off time of 1 s, and printing speed of 3 mm/s). Then, the file may be saved in a memory card, which may be inserted in the appropriate slot of the printer, and the printing process may be initiated.

A scheme of a 3D printed microfluidic cell fabrication and a lab-in-a-pencil graphite microfluidic sensing electrode ("µFSE") in accordance with an embodiment of the invention is shown in FIG. 1B. A scheme of a 3D printed microfluidic cell fabrication (3D-printing of the electrode; insertion of PGEs in the cavities; and drilling the cell) and image of the µFSE is provided. For example, in image 150, the process of fabrication may include a 3D printer 152 3D printing a microfluidic chamber 154. The fabrication process may further include inserting a plurality of PGEs (e.g., three PGEs; PGE 156 and PGE 158 are shown) into the chamber 154. For example, three flat shaped PGEs may be inserted into special cavities on the 3D printed chamber 154, and a hole 160 may be opened in the middle of the flat surface of the chamber 154 by using a manual drilling machine 162 (e.g., diameter: 800 µm). Then, tubes (e.g., Cole-Parmer, Masterflex Transfer Tubing, Teflon (PTFE) 305 µm inner diameter, and 762 µm outer diameter) may be inserted (e.g. by push-fitted) and sealed with epoxy resin.

In reference to FIG. 1B, image 170 illustrates a perspective view of a µFSE 171 having three PGEs 172, 174, 176. Further, image 180 also illustrates a perspective view of the µFSE 171 having three PGEs 172, 174, 176 where the PGEs are designated as a CE, RE, WE and attached to a potentiostat. In some embodiments, the potentiostat 182 may control the WE's potential. In some embodiments, the µFSE 171 may be fitted with a tube 184 that may be connected to a pump 186 to move a fluid for analysis (e.g., detection and/or measurement of analyte(s) in the fluid) by the µFSE 171.

Flow Injection Analysis (FIA) Procedures—Electrochemical measurements may be performed using various methods known to one of skill in the art. For example, electrochemical measurements may be carried out using a CompactStat portable electrochemical potentiostat (from Ivium Technologies). In some embodiments, PGEs were used as working, counter, and reference electrodes and connected to the potentiostat with crocodile clips. Before electroanalytical experiments, the PGEs in the µFSE may be activated electrochemically by Cyclic Voltammetry (CV) scanning at a positive potential between 0 V and 1.2 V with the scan rate of 100 mV/s for 50 cycles in 0.1 M phosphate buffer solution (pH 7.4). Then, the Nafion solution in ethanol (2% w/w) was flowed in the µFSE and left to dry for 10 min in the obtained selective sensing electrode. Flow injection analysis may be carried out by using a high-performance liquid chromatography (HPLC) pump (Shimadzu LC-10AD), which may have a six-way injection valve (5 µL sample loop). The dilution effect of the distance between the sample loop and the sensing cell was decreased by keeping this distance short (length of tubing: 10 cm). PBS was may be used as a carrier solution and flushed for 6 min to get background current. Flow injection amperometric current-time plots may be obtained by three successive injections of Clz solution prepared in 10 mM pH 7.4 PBS under a fixed operating potential of +320 mV. Interferences may be measured by comparing the currents of alternate injections of clozapine (2.5 µM) and the possibly interfering substance dissolved in the same clozapine solution or in the PBS with the indicated concentrations. All measurements may be performed with a fresh electrode and repeated at least three times at room temperature.

Although specific materials and instrumentations, µFSE fabrication processes, and FIA procedures are discussed above with respect to FIGS. 1A-1B, any of a variety of materials and instrumentations, µFSE fabrication processes, and FIA procedures as appropriate to the requirements of a specific application may be utilized in accordance with embodiments of the invention. Results and discussion in accordance with embodiments of the invention are discussed further below.

RESULTS AND DISCUSSION

Figure 2A:
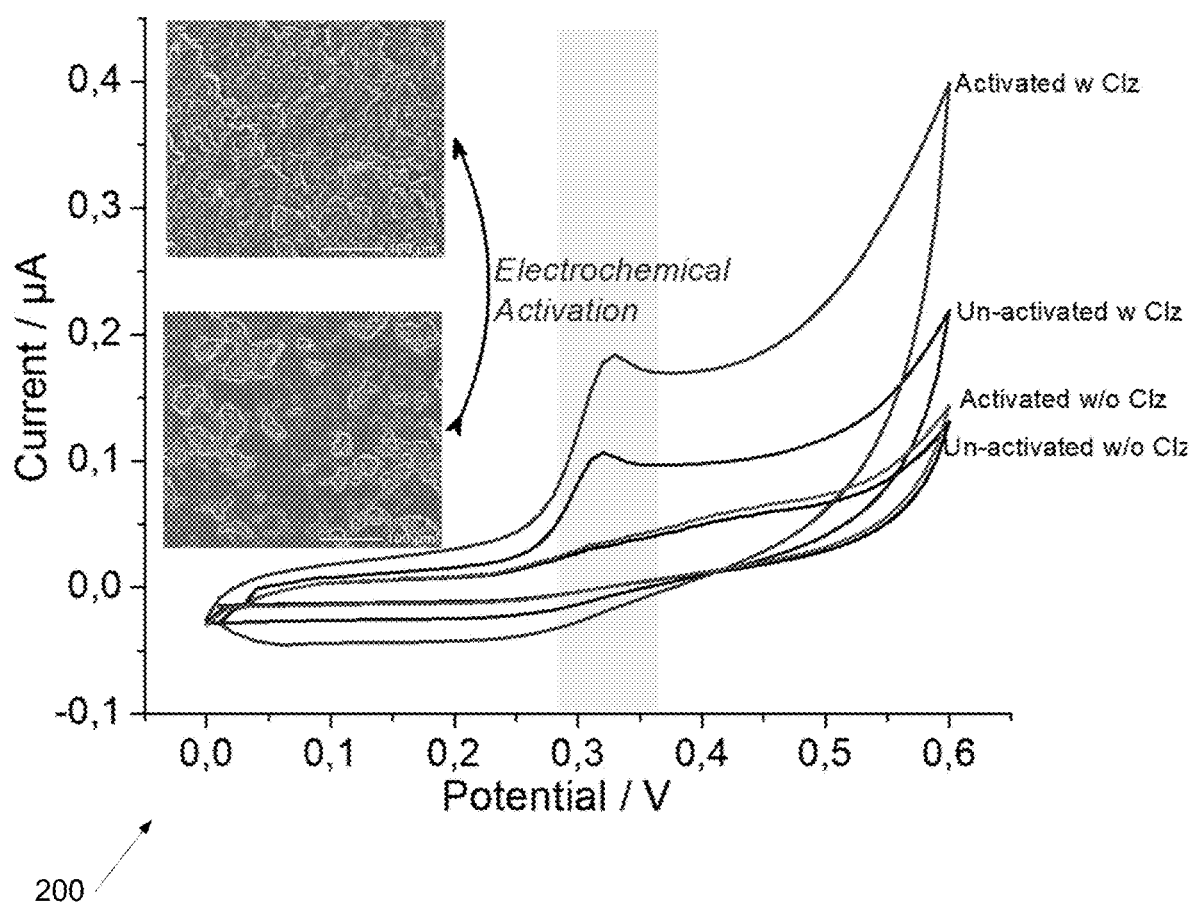
FIG. 2A is a graph illustrating a CV curve of a μFSE accordance with an embodiment of the invention.

Electrochemical Characteristics—A graph 200 illustrating a CV curve of a µFSE accordance with an embodiment of the invention is shown in FIG. 2A. FIG. 2A shows the CV curves recorded with activated and bare µFSE with/without 5 µM Clz in 10 mM PBS, at a scan rate of 50 mV/s. The CV curves for Clz show an oxidation peak at ~0.32 V and reduction peak at ~0.27 V corresponding to the oxidation of clozapine to nitrenium ion and the subsequent reverse reaction. In some embodiments, the PGE may be activated electrochemically by scanning at a positive potential between 0 and 1.2 V with the scan rate of 100 mV/s for 50 cycles in PBS. Electrochemically activated working electrode shows considerable enhancement in the peak current compared to that of un-activated µFSE. In some embodiments, the rate of electron transfer increased due to an increase in the electroactive surface area and the formation of oxygen-containing functional groups in µFSE during electrochemical activation. The higher response resulting from the electrochemically activated PGEs may indicate improved electrocatalytic activity towards the tested redox molecule. It is estimated that the increased specificity of the activated PGEs towards the hydrophobic Clz may be due to an increased hydrophobic interaction and a decreased hydrophilic repulsion in the presence of the graphite oxygen functional groups. The surface morphologies of the un-activated and activated PGEs were investigated by the SEM and given as inset of FIG. 2A. SEM images showed that the un-activated PGE showed smooth surface morphology, whereas activated PGE showed a more rough structure. This may indicate that the electrochemical treatment process increased the surface roughness. This situation may increase the effective surface area of the activated PGEs leading to high peak currents during the electrochemical reactions.

The electroactive surface areas of the un-activated and activated PGEs may be calculated by plotting the peak current, Ip, as a function of the square root of the scan rate, v1/2, the slope, m, in electrochemical measurements of the $K_3Fe(CN)_6$ probe and found as 1.63 and 1.87 $mm^2$, respectively. The surface area was likely to be increased after electrochemical activation of the PGE.

Figure 2B:
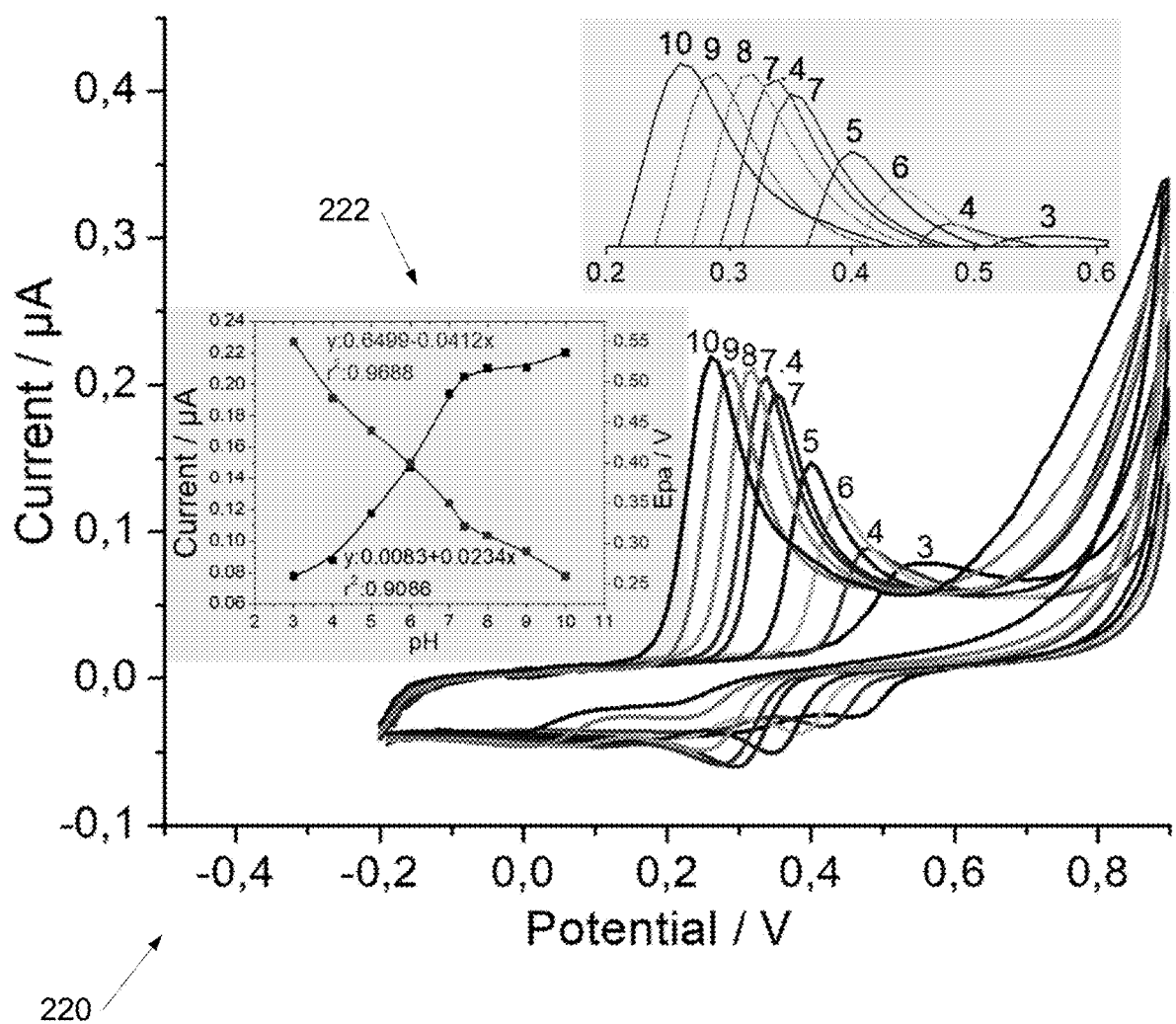
FIG. 2B is a graph illustrating a CV curve of a μFSE in a solution with different buffer pH values in accordance with an embodiment of the invention.

The effect of the solution pH on the electrochemical behavior of Clz-sensing device was studied. A graph 220 illustrating a CV curve of a µFSE in a solution with different buffer pH values in accordance with an embodiment of the invention is shown in FIG. 2B. The inset 222 in FIG. 2B shows plots of currents (Ipa) and oxidation potential (Epa) versus pH. In some embodiments, CVs may be recorded by using the µFSE with a pH value of 3 to 10 in the presence of 5 µM Clz in 10 mM PBS. In various embodiments, an optimal pH for the electrochemical detection of Clz in a solution may be found. The results showed that the electrochemical current response increased with increased pH of the solution. However, the electrochemical oxidation potential decreased with increasing the pH of the solution. The results indicate that the electrochemical response of Clz at the physiological level (7.4) may be acceptable and suitable to make real sample analysis without treatment of the sample.

Figure 2C:
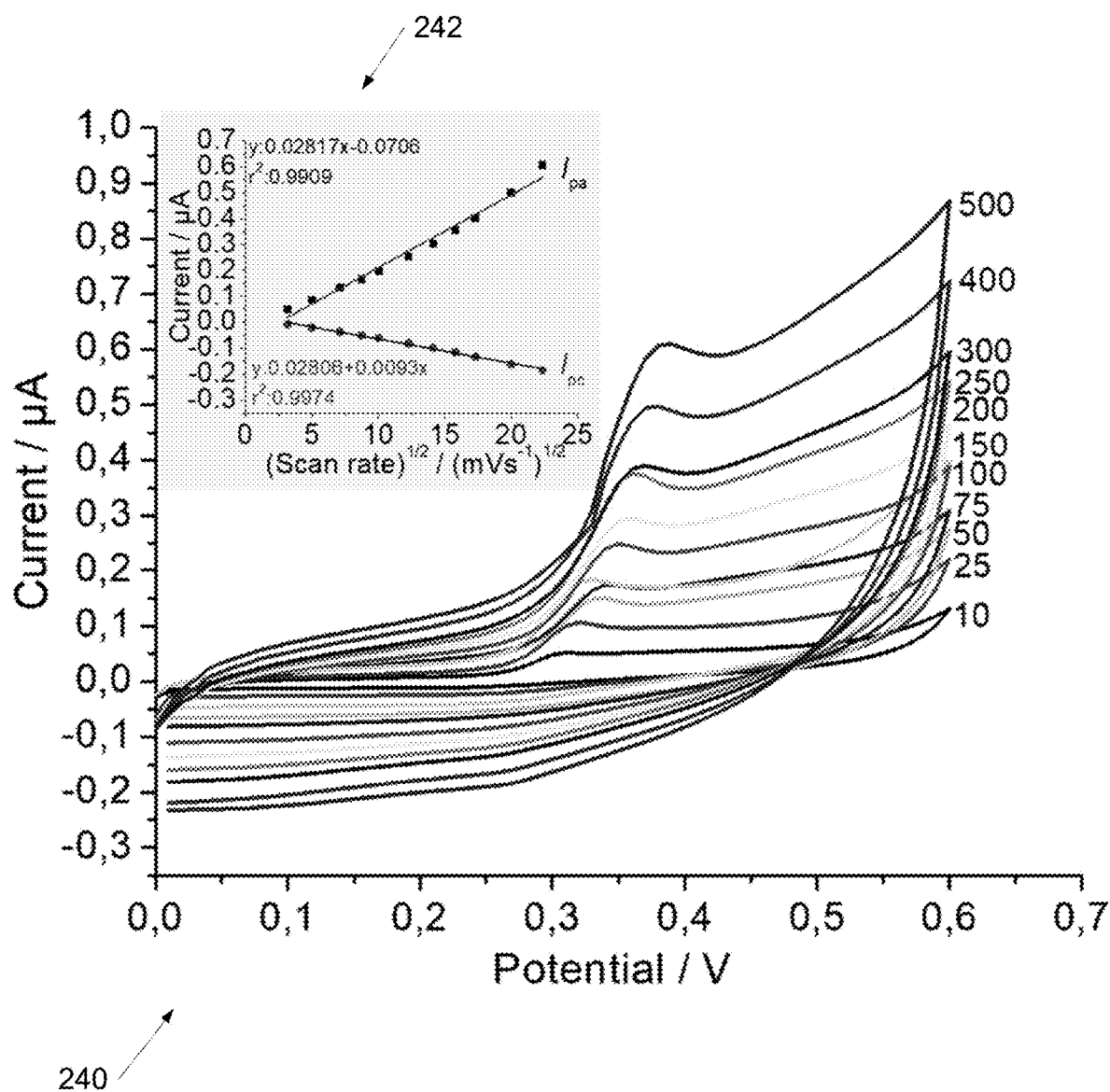
FIG. 2C is a graph illustrating a CV curve of a μFSE at different scan rates in accordance with an embodiment of the invention.

The influence of the scan rate of potential on the electrochemical oxidation of Clz was studied. A graph 240 illustrating a CV curve of a µFSE at different scan rates in accordance with an embodiment of the invention is shown in FIG. 2C. FIG. 2C illustrates the CV curve of the µFSE system in 5 µM Clz solution (pH 7.4, 10 mM PBS) at different scan rates. The inset 242 of FIG. 2C shows variation of CV anodic peak current responses in terms of the square root of the scan rate versus oxidation peak current value. In reference to FIG. 2C, the effect of the scan rate on the electrochemical response of the Clz in the µFSE is shown. The anodic peak current increased with increasing scan rates from 10 to 500 mV/s. It reveals a linear relationship between the Ip and the square root of the potential scan rate ($v^{1/2}$), suggesting a diffusion controlled Clz oxidation process. A linear correlation emerged between the cathodic current (Ipc) of the peaks and the square root of the scan rate ($V^{1/2}$). The electrochemical processes of Clz in μFSE were quasi-reversible because the anodic peak current (Ipa) and cathodic current (Ipc) was near equal (Ipa/Ipc~3.2), which is one of the primary indications of a quasi-reversible system.

Figure 2D:
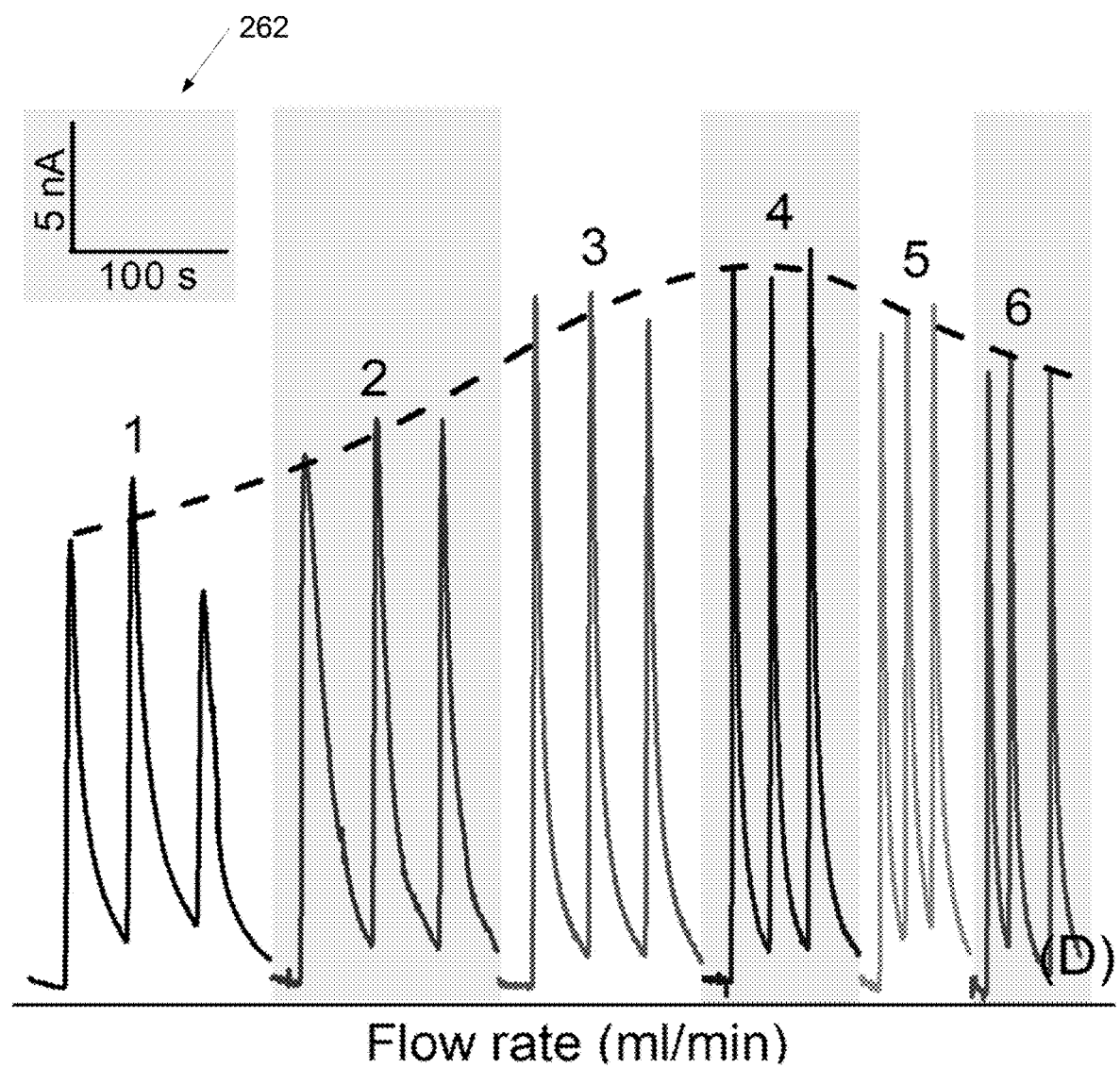
FIG. 2D is a graph illustrating flow injection amperometric current-time plot of three-successive injections of 2.5 μM Clz solution in accordance with an embodiment of the invention.

The flow rate of a solution may be an important parameter in the flow injection analysis of sensors. A graph 260 illustrating flow injection amperometric current-time plot of three-successive injections of 2.5 μM Clz solution in accordance with an embodiment of the invention is shown in FIG. 2D. In some embodiments, the Clz solution may be prepared in 10 mM pH 7.4 PBS and under varying flow rates at a fixed operating potential +320 mV. The inset 262 of FIG. 2D illustrates a current-time scale. In reference to FIG. 2D, the amperometric responses were recorded by three successive injections of Clz solution at various solution flow rates. The results showed that the amperometric peak currents were increased with an increasing flow rate from 1 to 4 mL/min. The low amperometric current response might be due to the dispersion of the analyte in the flow solution. However, the current response decreased when using 4 mL/min flow rate that might be due to the short interaction time of the analyte with the sensing electrodes. Moreover, the cyclic voltammograms were recorded at increasing flow rates (from 0.05 to 6 mL/min) of 2.5 μM Clz solution. In some embodiments, the anodic peak currents increased with increasing flow rate and reach a plateau at 2 mL/min. This might be due to the reaching of the saturation on the electrode surface.

Figure 3:
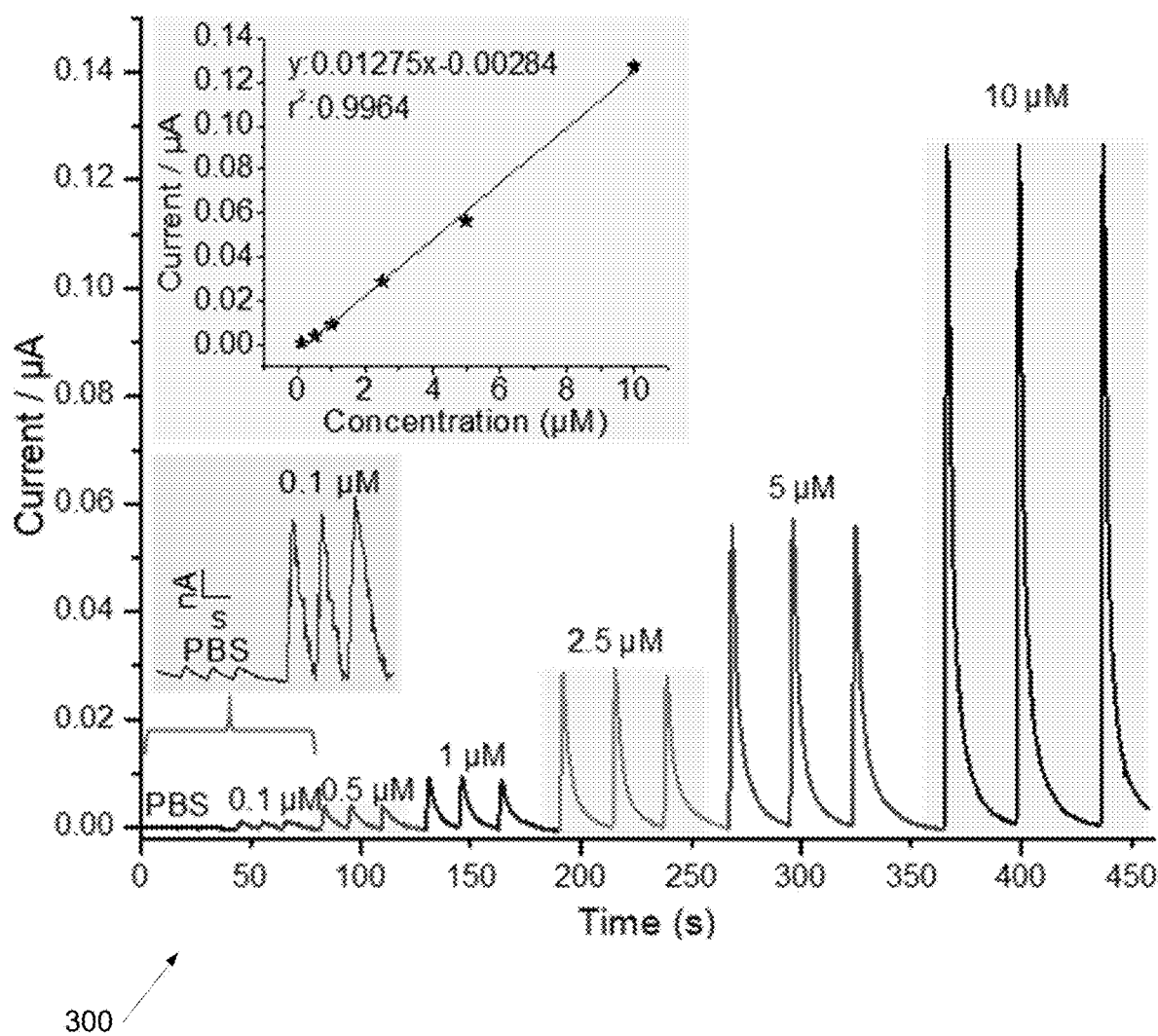
FIG. 3 is a graph illustrating flow injection amperometric current-time plots of three-successive injections of Clz with different concentrations in accordance with an embodiment of the invention.

Analytical features Electrochemical Clozapine measurements—Flow injection analysis of Clozapine. After the determination of the experimental parameters, the flow injection analysis performance of the μFSE was examined under optimized conditions. Therefore, the flow injection amperometric current-time responses were recorded by three successive injections of Clz with varying concentrations of 0.1 to 10 μM. A graph 300 illustrating flow injection amperometric current-time plots of three-successive injections of Clz with different concentrations in accordance with an embodiment of the invention is shown in FIG. 3. In reference to FIG. 3, flow injection amperometric current-time plots of three-successive injections of Clz with different concentrations in the range of 0.1 μM to 10 μM (carrier stream: pH 7.4 PBS applied potential: +320 mV; flow rate: 4 mL/min; sample loop: 3 μL; tubing length: 10 cm). As illustrated, FIG. 3 shows the current-time response of Clz at a fixed potential of +0.32V and a flow rate of 4 mL/min. The resulting calibration curve of Clz analysis is also given as inset in FIG. 3. As seen in FIG. 3, linear amperometric responses were observed with regression equation: y=0.01275x−0.00284 ($r^2$=0.9964). The detection limit may be calculated for the Clz biosensor based on 3sb/m where sb is the standard deviation of the blank response and m is the slope of the calibration curve. In some embodiments, the sensitivity of the sensor is 0.01275 μA/μM, with a detection limit of 24 nM.

Comparison of the performance characteristics of various electrochemical methods for Clz sensors with proposed electrodes is illustrated in Table 1 below.

| Electrode | Technique | LR (μM) | LOD (nM) | Ref. |
|---|---|---|---|---|
| μFSE | Amperometry | 0.1-10.0 | 24 | This work |
| ISE | Potentiometry | 10-10000 | 3400 | 37 |
| TiO$_2$/CPE | DPV | 0.5-45 | 61 | 38 |
| PGE | DPV | 0.0095-1.5 | 2.86 | 39 |
| RuTiO$_2$/CPE | SWV | 0.9-40 | 0.43 | 40 |

LR: Linear Range,
LOD: Limit of detection,
Ref: References,
ISE: Ion-selective electrode,
TiO$_2$/CPE: Titanium oxide modified carbon paste electrode,
SWV: Square wave voltammetry Furthermore, the fabricated microfluidic biosensor's various analytical performance parameters, including linear range and limit of detection, were compared with previously published Clz biosensors in Table 1 above. The linear range obtained for the μFSE is similar to the other Clz sensing electrodes. The detection limit value (24 nM) is higher than the ISE and TiO$_2$/CPE, but lower than the PGE and RuTiO$_2$/CPE. The obtained linear range and detection limit may be sufficient for the analysis of Clz in serum samples whose critical and efficient Clz level in the blood is in the range of 1-3 μM (350-1000 ng/mL). Therefore, it is a good alternative device for the analysis of Clz in serum samples.

Figure 4A:
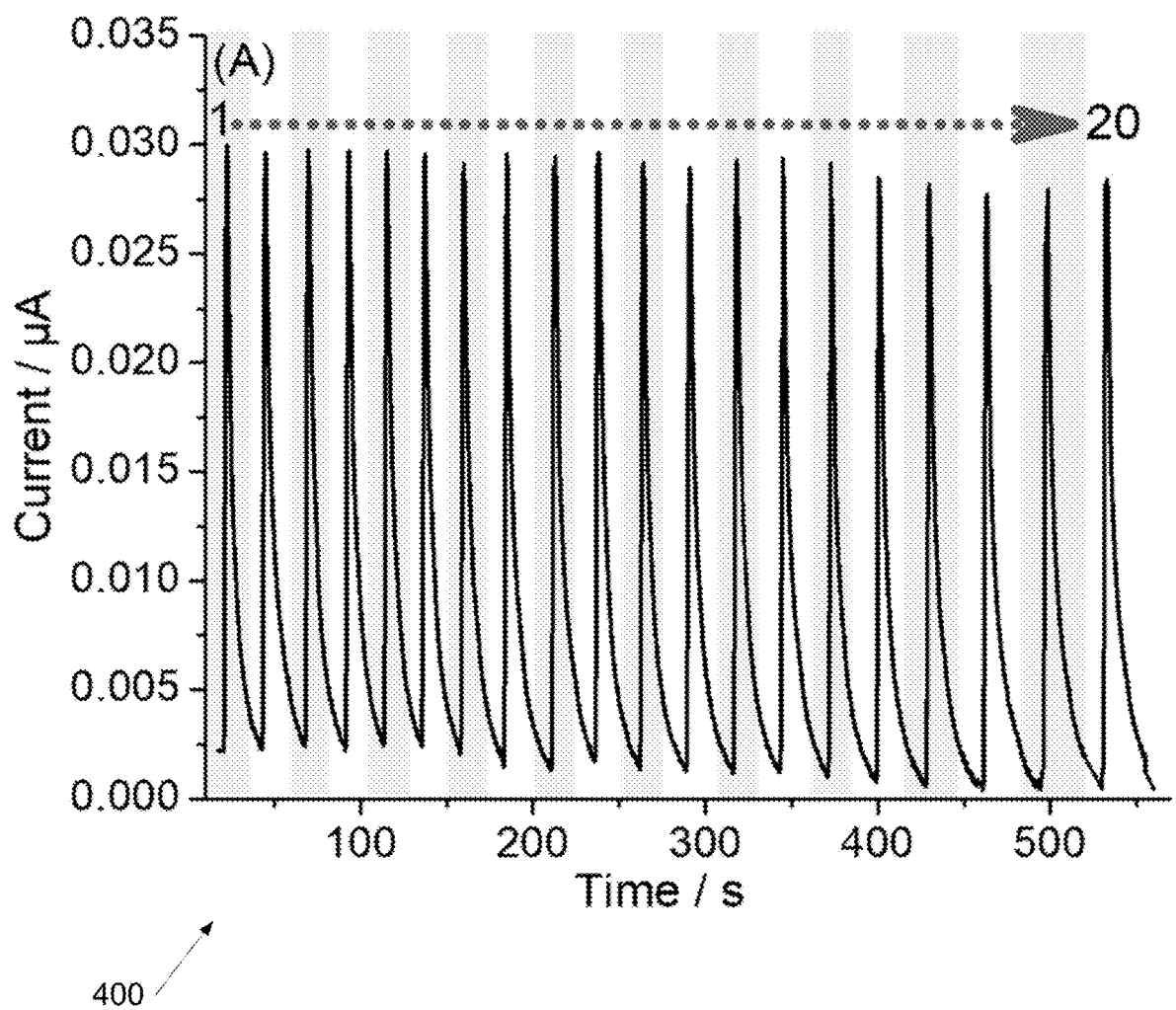
FIG. 4A is a graph illustrating flow injection amperometric current-time plots of 5 μM Clz obtained from intra-day in the μFSE, at 20 successive injections and inter-day, in accordance with an embodiment of the invention.
Figure 4B:
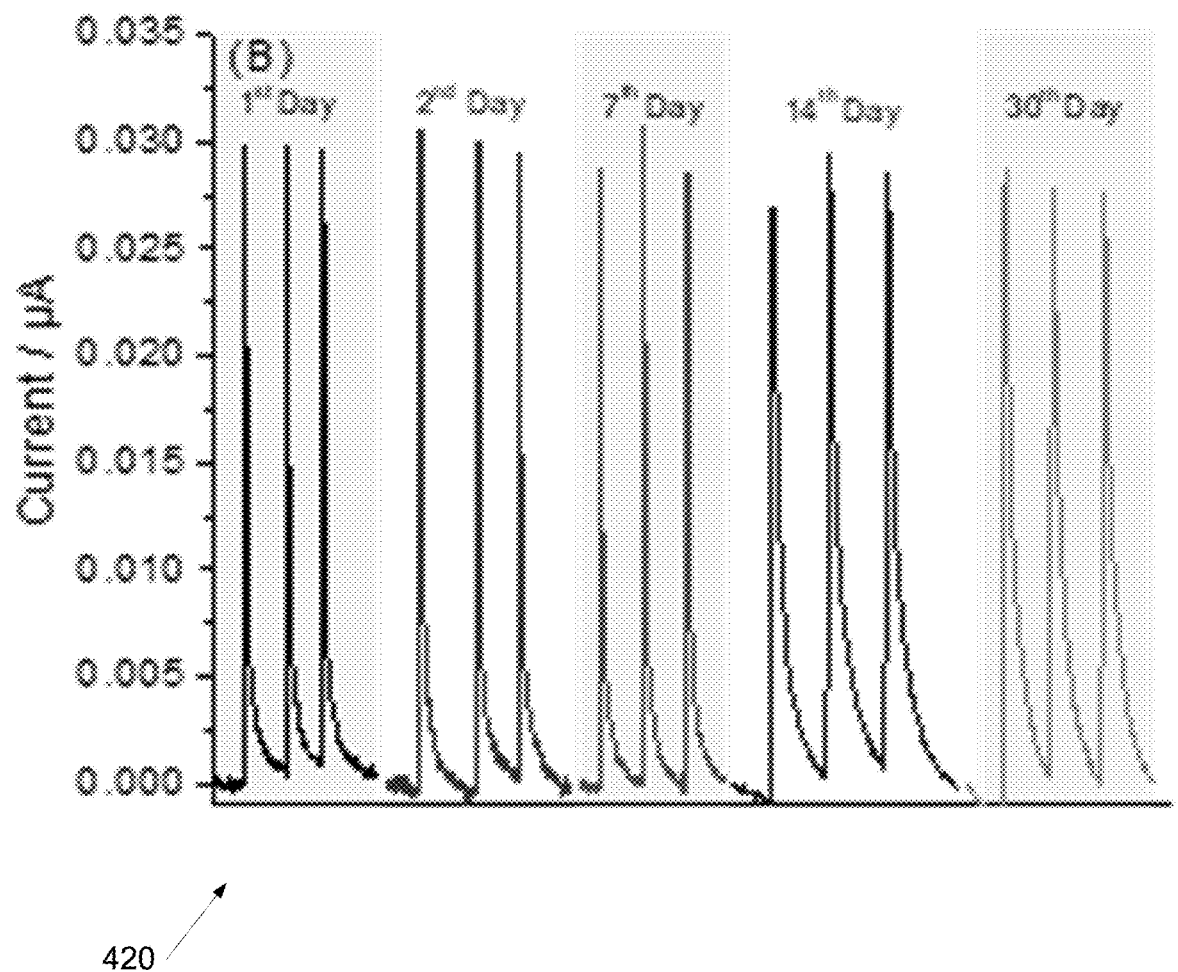
FIG. 4B is a graph illustrating flow injection amperometric current-time plots of 5 μM Clz obtained from intra-day in the μFSE, at three successive injections per day, in accordance with an embodiment of the invention.

Analytical features Electrochemical Clozapine measurements—Reusability and shelf-life studies. Reusability may be an important performance parameter of a real-time continuous monitoring sensor. A graph 400 illustrating flow injection amperometric current-time plots of 5 μM Clz obtained from intra-day in the μFSE, at 20 successive injections and inter-day, in accordance with an embodiment of the invention is shown in FIG. 4A. FIG. 4A shows the reusability experimental results of the μFSE under optimized conditions. The μFSE showed excellent response through Clz flow injection analysis up to 20 successive injections on the same day. In addition, the shelf life of the Clz sensor was investigated. A graph 420 illustrating flow injection amperometric current-time plots of 5 μM Clz obtained from intra-day in the μFSE, at three successive injections per day, in accordance with an embodiment of the invention is shown in FIG. 4B. The μFSE sensor gives a highly stable response to Clz with a low RSD of 2.85% until day 7. After a week, the sensor's response decreased producing a stable response to the Clz up to 30 days with an 8% decrease compared to the measurement performed on day 1.

Figure 4C:
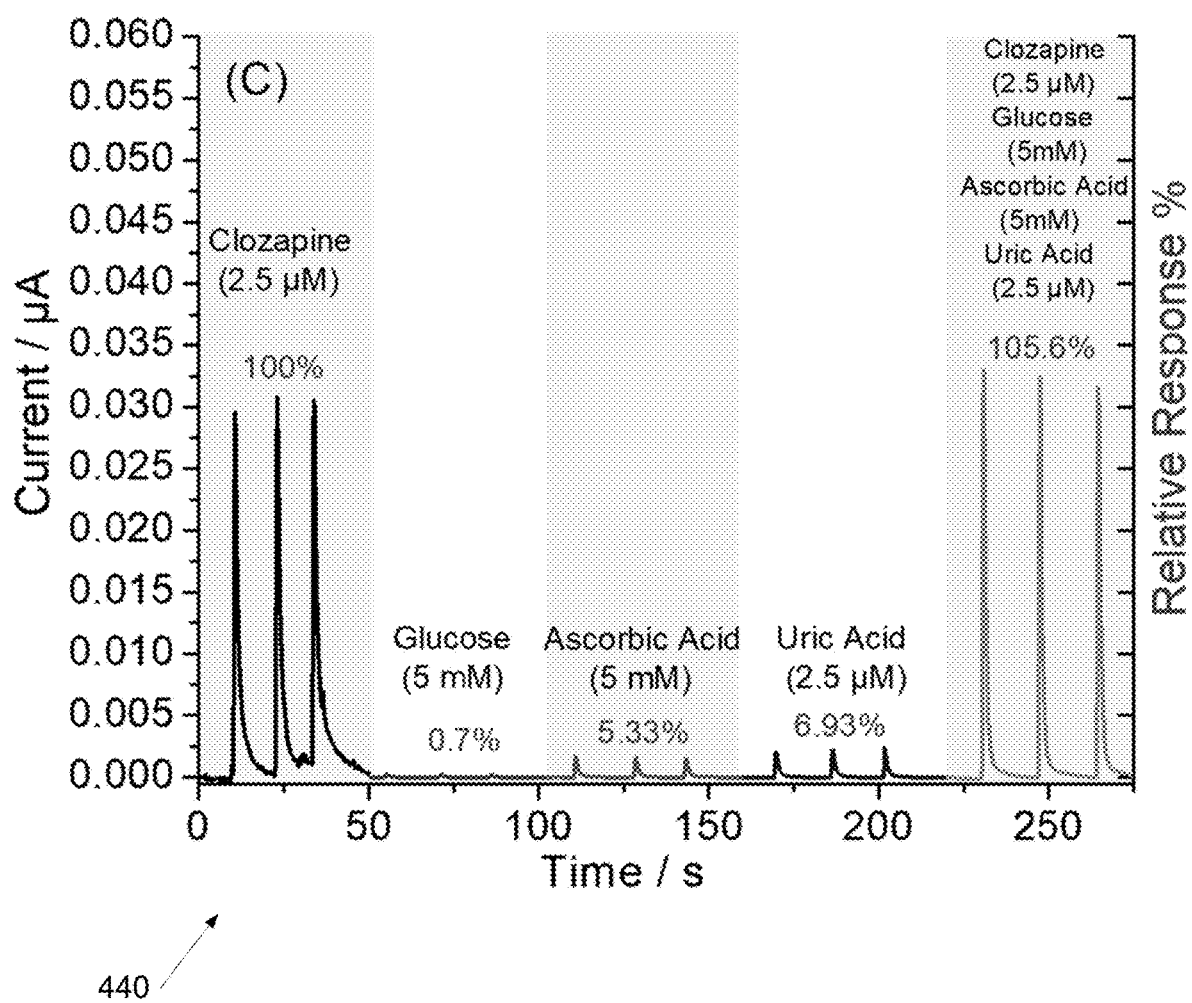
FIG. 4C is a graph illustrating flow injection amperometric current-time plots showing interference responses towards ascorbic acid (5 mM), uric acid (2.5 μM), and glucose (5 mM) in accordance with an embodiment of the invention.

Analytical features Electrochemical Clozapine measurements Interference study. The selectivity of the μFSE was investigated by using common electrochemical interfering compounds in the blood. It may be an important parameter for a biosensor and determine the applicability of it. Solutions containing 2.5 μM Clz with/without different concentrations of potential interference substances such as glucose, ascorbic acid and uric acid were evaluated using the μFSE sensor. A graph 440 illustrating flow injection amperometric current-time plots showing interference responses towards ascorbic acid (5 mM), uric acid (2.5 μM), and glucose (5 mM) in accordance with an embodiment of the invention is shown in FIG. 4C. Results show that with 0.7% for Glu, 5.33% for AA, 6.93% for UA and 105.6% for All (mixture) of Clz 2.5 μM Clz caused response. As shown in FIG. 4C, approximately max ±7% relative error in the measurement of Clz was observed after taking the tolerance limit as the maximum concentration of the interfering substances. The surface coating of the μFSE sensor with Nafion reveals excellent selectivity through Clz due to its ion-selective behavior.

Figure 4D:
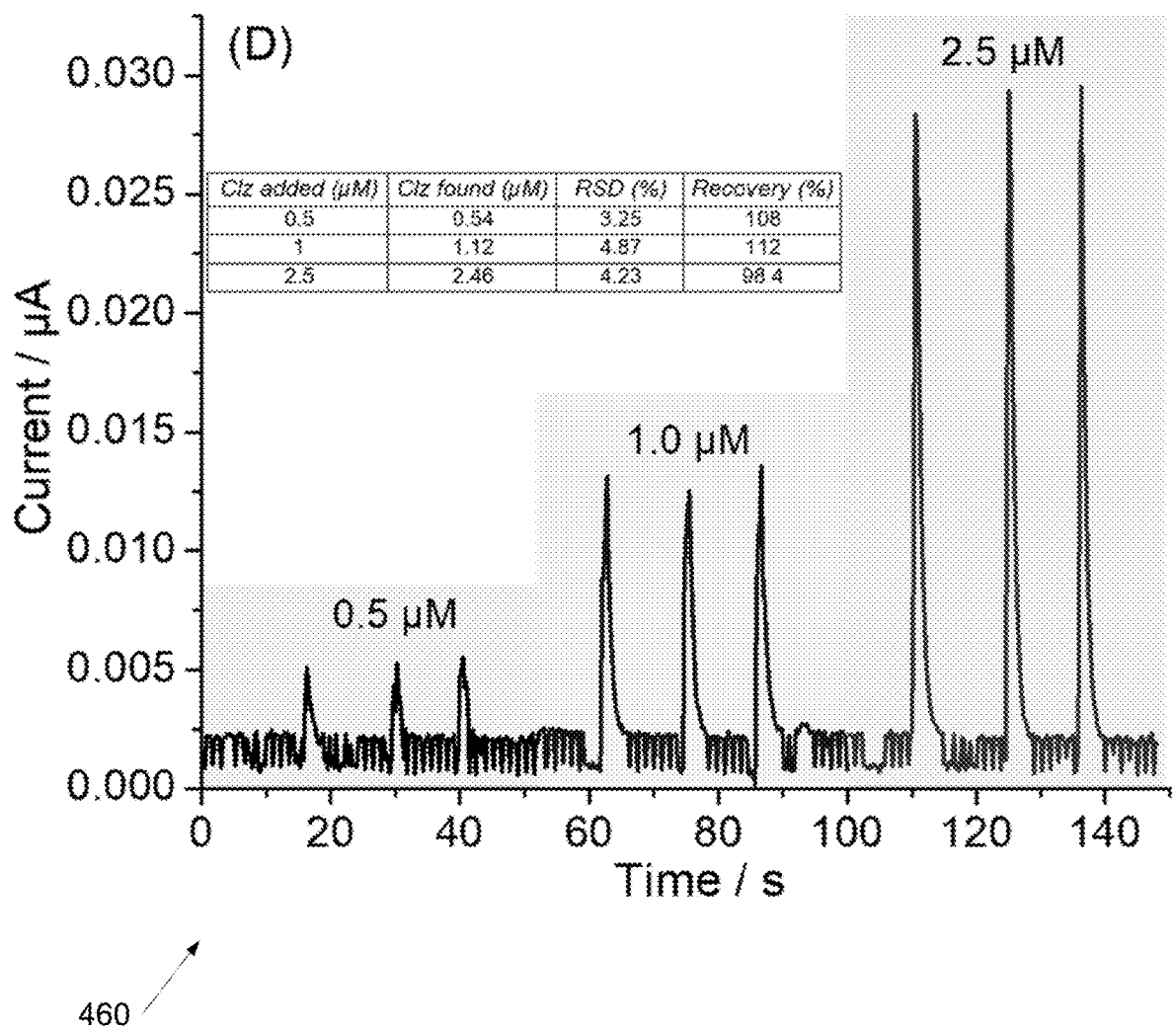
FIG. 4D is a graph illustrating flow injection amperometric current-time plots of real sample analysis of the Clz (0.5, 1, and 2.5 μM) spiked human serum samples in the μFSE in accordance with an embodiment of the invention.

Analytical features Electrochemical Clozapine measurements—Real sample analysis. Real sample analysis may be important to investigate the potential use of the designed sensor in real analysis of target analyte(s). A graph 460 illustrating real sample analysis of the Clz (0.5, 1, and 2.5 µM) spiked human serum samples in the µFSE in accordance with an embodiment of the invention is shown in FIG. 4D. The real sample analysis may be carried out for monitoring of Clz in spiked human serum samples. Different concentrations of Clz were used to spike human serum samples and were used directly without any treatment. The inset of FIG. 4D shows the recovery analysis data of the clozapine biosensor. The results show recovery ranging from 96.4% to 108% with RSD % values ~4% for spiked serum samples. Further, the results show that the µFSE may be simple, convenient, and reliable for real-time flow injection analysis of Clz in the serum sample.

Although specific analysis, results, and interpretations for µFSEs are discussed above with respect to FIGS. 2A-4D, any of a variety of analysis, results, and interpretations for µFSEs as appropriate to the requirements of a specific application can be utilized in accordance with embodiments of the invention. Cartridge µFSE devices in accordance with embodiments of the invention are discussed further below.

Cartridge µFSE Devices

Figure 5:
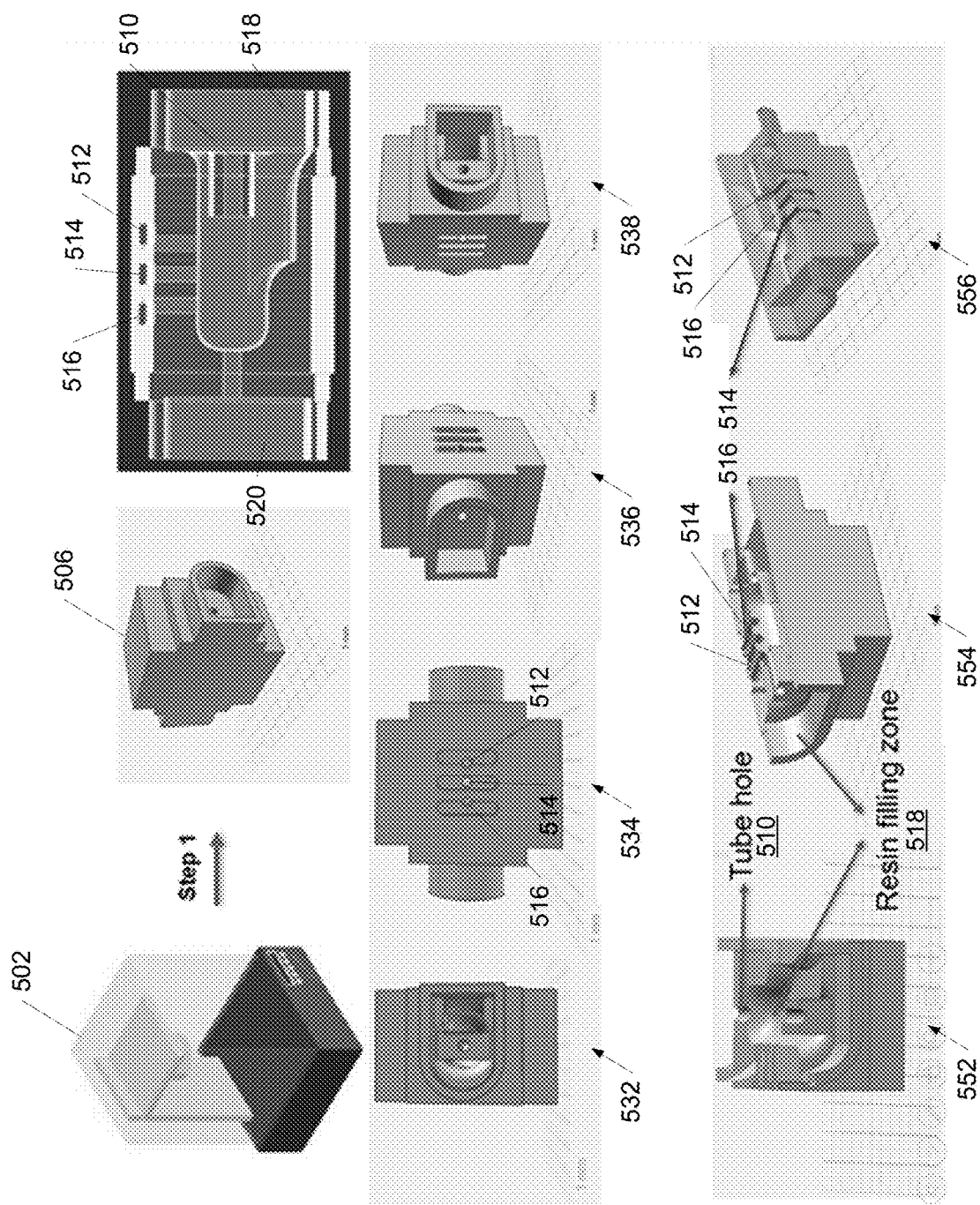
FIG. 5 is a scheme showing the layout of a μFSE device and fluidic channels and details about the geometry of experimental cell in accordance with an embodiment of the invention.

As described above, µFSEs with integrated electrodes may be utilized for detection of analyte(s) in small-volume fluid. Additional processes for fabrication of µFSEs are provided. A scheme showing the layout of a µFSE device and fluidic channels and details about the geometry of experimental cell in accordance with an embodiment of the invention is shown in FIG. 5. In many embodiments, a fabrication process may include generating a microfluidic chamber having a plurality of electrode holes and at least one tube hole. For example, a 3D printer 502 may be utilized to 3D print a holder 506 (may also be referred to as a "microfluidic chamber" or "chamber"). In many embodiments, µFSEs may be designed using CAD software such as, but not limited to, SolidWorks® software (Dassault Systemes, France). The inner diameter of the sensing channel of the device may be configured (e.g., 400 µm), and the inner electroactive sensor volume may be calculated (e.g., as ~0.5 µL). The respective file in .STL format may be opened using a 3D printer software such as, but not limited to, the Anycubic Photon 3D SLA printer software. In various embodiments, the printing conditions may be determined (e.g., layer thickness: 0.03 mm, with an exposure time of 8 s, off time of 1 s, and printing speed of 3 mm/s). Then, the file may be saved in a memory card, which may be inserted in the appropriate slot of the printer, and the printing process was initiated.

In reference to FIG. 5, a layout view 508 of the 3D printed holder 506 is provided. In many embodiments, the holder 506 may include a tube hole 510 a plurality of electrode holes (e.g., electrode holes 512, 514, 516). In some embodiments, the holder 506 may also include one or more resin fill zone(s) (e.g., resin a first resin fill zone 518 and a second resin fill zone 520).

In reference to FIG. 5, various views of the holder 506 are provided. For example, a top view 532 of the holder 506 is provided. Further, a side view 534 showing the electrode holes 512, 514, 516 of the holder 506 is provided. Moreover, a bottom and side view 536 of the holder 506 is provided. Furthermore, a top and side view 538 of the holder 506 is provided. In addition, various cross sectional views of the holder 506 are provided. In cross sectional view 552, a tube hole 553 and resin filing zone. Further, in cross sectional view 554, the resin filling zone 518 and electrode holes 512, 514, 516 are illustrated. Furthermore, in cross sectional view 556, the electrode holes 512, 514, 516 are illustrated.

As illustrated in FIG. 5, the fabrication process may include fitting (e.g., push-fitting) in a center (e.g., tube hole 510) of the µFSE device a plastic tube (e.g., Cole-Parmer, Masterflex Transfer Tubing, Teflon— PTFE, 100 µm inner diameter, and 400 µm outer diameter), and the cavity (e.g., resin filling zones 518, 520) between tube and printed device body may be filled with a filler material (e.g., a resin). The process may also include inserting into special cavities (e.g., electrode holes 512, 514, 516) on the 3D printed flow device three metal rods (e.g., Au, Pt, and Ag). In some embodiments, the process may further include opening a hole in the middle of a flat surface of the flow device. For example, the hole may be opened using a manual drilling machine (diameter: 400 µm).

Figure 6:
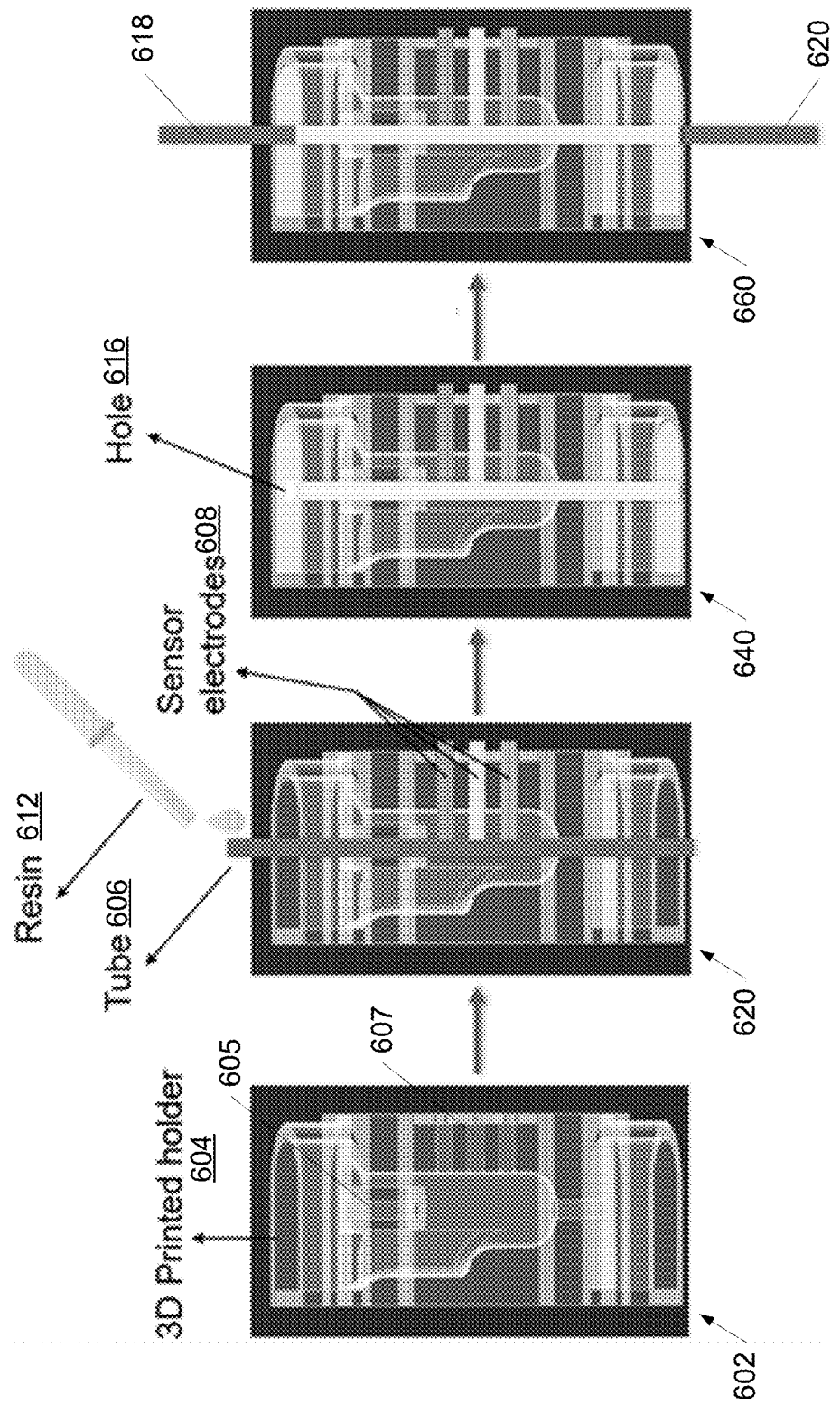
FIG. 6 is a scheme showing the layout of a μFSE device and electrode insertion procedure in accordance with an embodiment of the invention.

A scheme showing the layout of a µFSE device and electrode insertion procedure in accordance with an embodiment of the invention is shown in FIG. 6. Image 602 illustrates a layout view of a 3D printed holder 604, as further described above. In various embodiments, a fabrication process may include inserting a tube 606 into a tube hole 605 and a plurality of electrodes 608 into corresponding electrode holes 607 of the holder 604 as illustrated in images 602 and 620. In many embodiments, the fabrication process may also include filling a cavity (e.g., a first resin filing zone 610 and a second resin fill zone 611) of the device using a filler (e.g., a resin 612), as illustrated in image 620. For example, the resin filling zones 610, 611 may be filled with clear epoxy resin and left to dry overnight at room temperature. In many embodiments, the tube 606 may be removed from the tube hole 605. In various embodiments, removing the tube 606 may leave an empty hole (may also be referred to as the "sensing zone") in the chamber 604 allowing fluid to pass through the chamber and allowing the fluid to be in contact with plurality of electrodes 608. In some embodiments, after the tube 605 is removed, a first connection hole 616 and a second connection hole 617 may be opened. In some embodiments, the first and second connection holes 616, 617 may be drilled. In a variety of embodiments, the process may also include inserting (e.g., push-fitting) a first and second connection tubes 618, 620 (e.g., Cole-Parmer, Masterflex Transfer Tubing, Teflon—PTFE, 100 µm inner diameter, and 400 µm outer diameter) in both sides of the µFSE device. In various embodiments, the process may also include testing the electroanalytical performance of the µFSE device.

Although specific materials and instrumentations and µFSE fabrication processes are discussed above with respect to FIGS. 5-6, any of a variety of materials and instrumentations and µFSE fabrication processes as appropriate to the requirements of a specific application may be utilized in accordance with embodiments of the invention. For example, although described herein utilizing resin, one of ordinary skill would appreciate that any substance that has similar properties such as, but not limited to, a viscous substance that may solidify may be utilized in accordance with embodiments of the invention. Syringe-based µFSE devices (may also be referred to as "µSyringe" or "syringe µFSE devices") in accordance with embodiments of the invention are discussed further below.

Syringe µFSE Devices

Figure 11A:
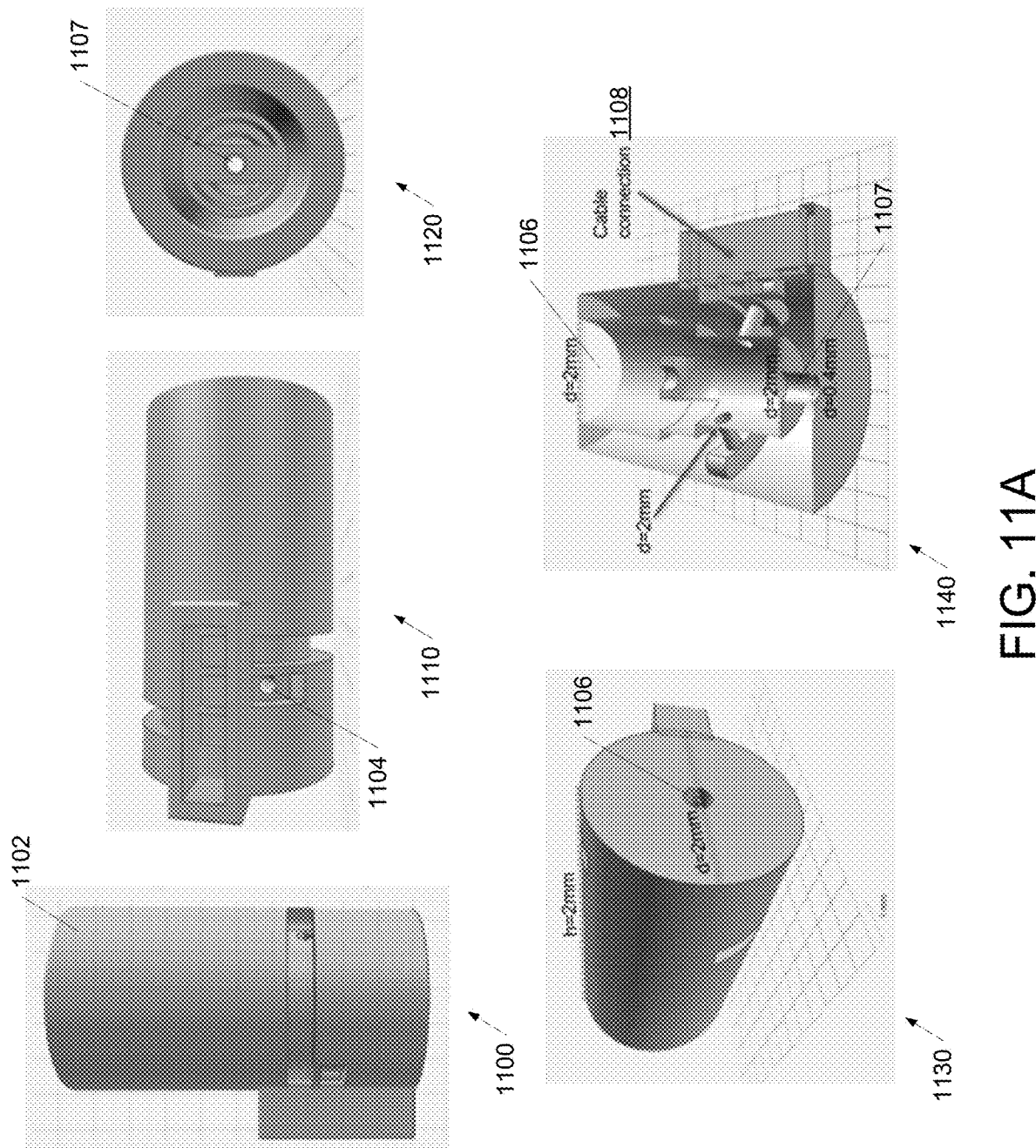
FIG. 11A illustrates a 3D model of a μSyringe sensing device in accordance with an embodiment of the invention.

Microfluidic sensing devices may include syringe-based µFSE devices. A fabrication process for a µSyringe is provided. A 3D model of a µSyringe sensing device in accordance with an embodiment of the invention is shown in FIG. 11A. A side view of the μSyringe 1102 is provided in image 1100. Another side view of the μSyringe 1102 is provided in image 1110. In many embodiments, the μSyringe 1102 may include any number of electrode holes for receiving a corresponding number of electrodes, as further described above. For example, the μSyringe 1102 may include a plurality of electrode holes (electrode hole 1104 is illustrated). A top view of the μSyringe 1102 is provided in image 1120. In various embodiments, the μSyringe 1102 may include a side having a syringe connection hole 1107 that is configured to receive a syringe that may inject a fluid for analysis, as further described below.

In reference to FIG. 11A, image 1130 provides a perspective view of the μSyringe 1102. In some embodiments, the μSyringe 1102 may have a tubular geometry with a diameter of 2 mm and a height of 2 mm. In some embodiments, the μSyringe 1102 may include a tube hole 1106 configured to receive a tube, as further described above. A cross sectional view of the μSyringe 1102 is provided in image 1140. In some embodiments, the μSyringe 1102 may include one or more cable connection(s) 1108. In some embodiments, the μSyringe 1102 may include a plurality of electrode holes (e.g., electrode hole 1104) for receiving electrodes, as further described above. In some embodiments, the electrode holes may be 2 mm in diameter. In many embodiments, the μSyringe 1102 may have a tube hole 1106 and a syringe connection hole 1107. In some embodiments, the tube hole 1106 may have an exterior diameter (e.g., 2 mm) and an inner diameter (e.g., 0.4 mm), where the inner diameter may be smaller than the exterior diameter.

The process may include designing a μSyringe 1102 using a CAD program such as, but not limited to, SolidWorks® software (Dassault Systemes, France). In some embodiments, the inner diameter of the sensing channel of the device may be determined (e.g., 400 μm), and an inner electroactive sensor volume may be calculated (e.g., as ~0.54 μL). In some embodiments, the respective file (e.g., in .STL format) may be opened using a 3D printer program such as, but not limited to, Anycubic Photon 3D SLA printer software. In some embodiments, the printing conditions may be determined (e.g., layer thickness: 0.03 mm, with an exposure time of 8 s, off time of 1 s, and printing speed of 3 mm/s). The process may also include saving the file on a memory card, inserting it in the printer, and initiating the printing process.

Figure 11B:
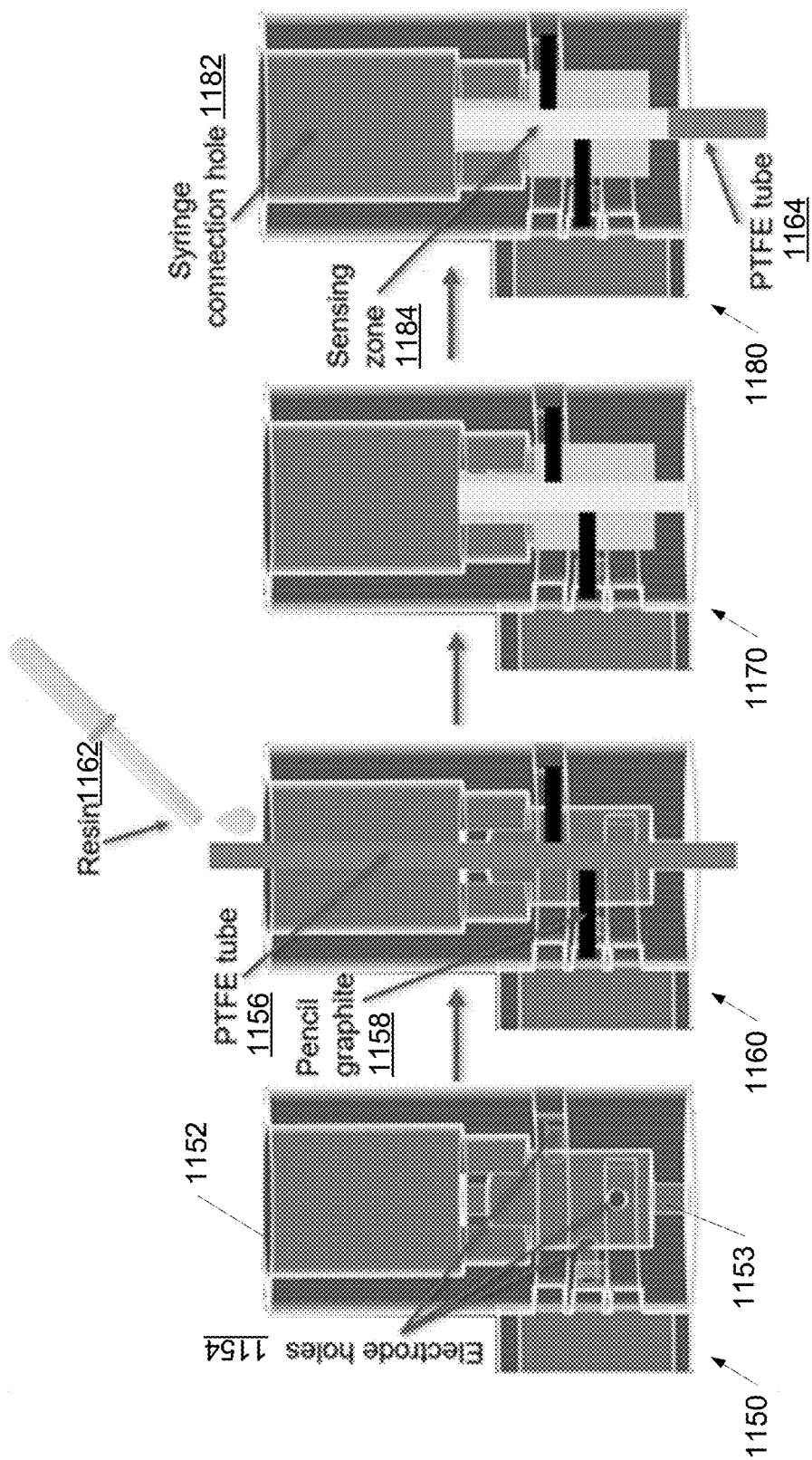
FIG. 11B illustrates a scheme for μSyringe sensor fabrication and an image of an μSyringe in accordance with an embodiment of the invention.

A scheme for μSyringe sensor fabrication and an image of an μSyringe in accordance with an embodiment of the invention is shown in FIG. 11B. As illustrated in FIG. 11B, the μSyringe sensor fabrication may also include insertion of PGEs in the cavities on 3D-printed holder (may also be referred to as a "microfluidic chamber" or "chamber"). Image 1150 illustrates a layout view of a 3D printed holder 1152 having electrode holes 1154 and a tube hole 1153. In various embodiments, a fabrication process may include inserting a tube 1156 into the tube hole 1153 and a plurality of electrodes (e.g., PGEs 1158) into corresponding electrode holes 1154 of the holder 1152 as illustrated in image 1160. In many embodiments, the fabrication process may also include adding resin 1162, as described herein. In some embodiments, the process may also include curing resin 1162 and attaching a sampling tube as illustrated in image 1160. In some embodiments, a three flat-shaped PGEs 1158 may be inserted into special cavities (e.g., electrode holes 1154) on the 3D printed holder 1152. In many embodiments, the tube 1156 may be removed from the tube hole 1153. In various embodiments, removing the tube 1156 may leave an empty hole in the chamber (may also be referred to as the "sensing zone") allowing fluid to pay through the chamber and allowing the fluid to be in contact with the plurality of electrodes (e.g., PGEs 1154) In addition, a hole may be opened in the middle of the flat surface of the holder 1152 as illustrated in image 1170. For example, the hole may be opened using a manual drilling machine (diameter: 400 μm). The process may also include fitting (e.g., push-fitting) tubes 1164 (e.g., Cole-Parmer, Masterflex Transfer Tubing, Teflon (PTFE) 305 μm inner diameter, and 402 μm outer diameter) and sealing (e.g., sealed with epoxy resin) as illustrated in image 1180. In some embodiments, the holder 1152 may also include a syringe connection hole 1182 and a sensing zone 1184.

Syringe μFSE device: Syringe sensor fabrication—The process for fabrication of the syringe μFSE device may include an infiltration step that may allow for the creation of heterogeneous hydrogel constructs. In many embodiments, this may occur through control of infiltrated precursor solutions alongside their gelation rate. In several embodiments, inlet flow rates, infiltrated volumes, and flow stabilization times may be programmed to modify the local characteristics of the final hydrogel. Additionally, controlling the magnitude of inlet flow rates and the bulk gelation rate of the hydrogel precursor solutions, for example, through crosslinker concentration, may enable control over the gradient interfaces that occur between different sections of the hydrogel. Slower flow rates may encourage near laminar flows that can yield more defined interfacial boundaries, whereas faster flow rates may encourage turbulent flows that can stimulate the formation of interfacial gradients. Inversely, slower bulk gelation rates may translate to longer time frames over which diffusion can occur between separate regions facilitating gradient formation, while faster gelation rates may reduce such time frames and encourage more defined boundaries between regions. Furthermore, control over the infiltrated volumes yields regions of varying size may add further complexity to the final gel structures.

Figure 7:
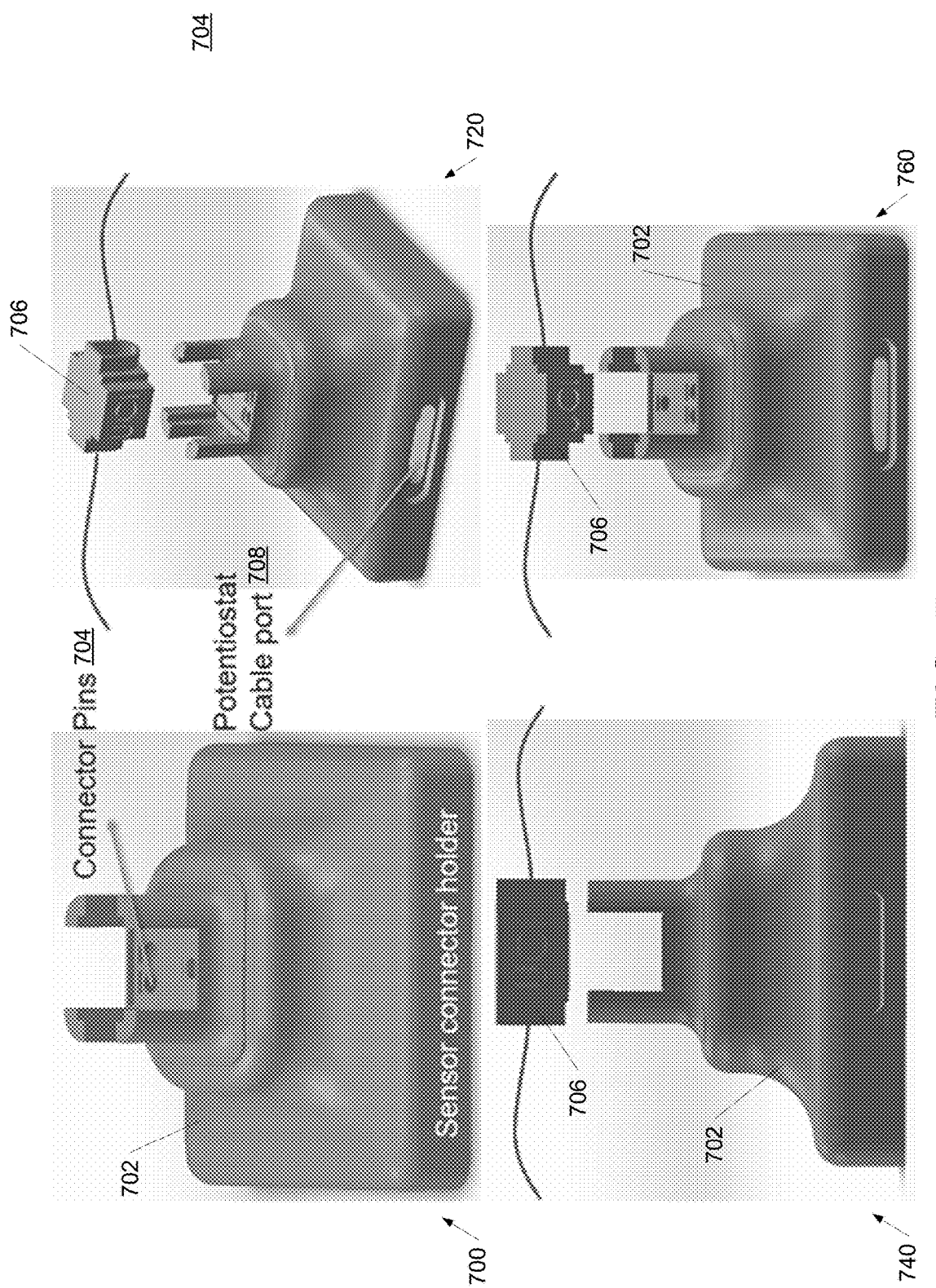
FIG. 7 is a scheme showing a μFSE device and its connection board in accordance with an embodiment of the invention.
Figure 8:
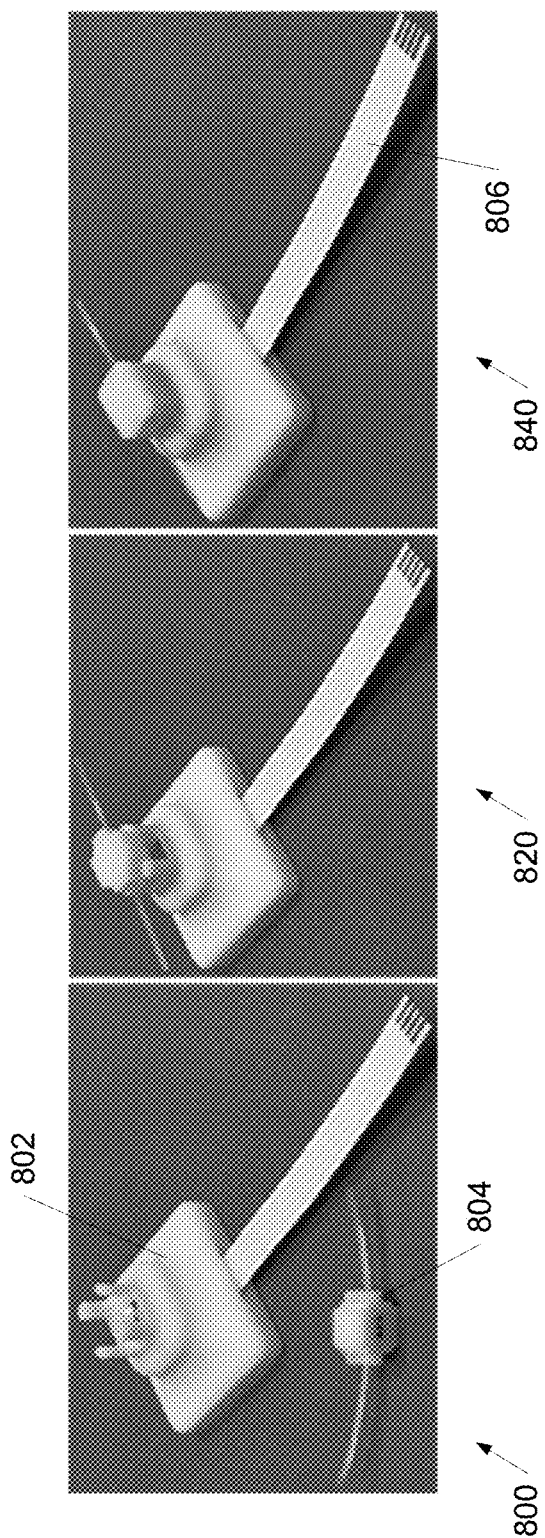
FIG. 8 are images of a μFSE device and its connection board in accordance with an embodiment of the invention.

A scheme showing a μFSE device and its connection board in accordance with an embodiment of the invention is shown in FIG. 7. Image 700 provides a front perspective view showing a sensor connector holder 702 (may also be referred to as a "connection board") having connector pins 704. Image 720 provides a side back perspective view showing the sensor connector holder 702 receiving the μFSE device 706. In some embodiments, the sensor connector holder 702 may also include a potentiostat cable port 708. Image 740 provides a back view showing the sensor connector holder 702 receiving the μFSE device 706. Image 760 provides a back perspective view showing the sensor connector holder 702 receiving the μFSE device 706. The electroanalytical performance of the μFSE device 706 may be tested after attaching a sensing device into its connection board 702 as illustrated in FIG. 7. Images of a μFSE device 804 and its connection board 802 in accordance with an embodiment of the invention are shown in FIG. 8. Image 800 illustrates the connection board 802 and the μFSE device 804 before connection. Image 820 illustrates the connection board 802 receiving the μFSE device 804. Image 840 illustrates the connection board 802 and the μFSE device 804 connected. In some embodiments, the connection board 802 may be connected to a potentiostat 806.

Electrochemical Measurements—As described above, electrochemical measurements may be made in a variety of ways. For example, electrochemical measurements may be carried out using a CompactStat portable electrochemical potentiostat (Ivium Technologies). In some embodiments, PGEs may be used as working, counter, and reference electrodes and connected to the potentiostat with crocodile clips. In some embodiments, Nafion solution in ethanol (2% w/w) may be flowed in the μSyringe and left to dry (e.g., 10 min) in the obtained selective sensing electrode. In many embodiments, the PGEs in the μSyringe may be activated electrochemically by Cyclic Voltammetry (CV) scanning at a positive potential between 0 V and 1.2 V with the scan rate of 100 mV/s for 50 cycles in 0.1 M phosphate buffer solution (pH 7.4). In many embodiments, Amperometric current-time plots may be obtained by three successive analyses of DA solution prepared in 10 mM pH 7.4 PBS under a fixed operating potential of +200 mV.

Figure 9:
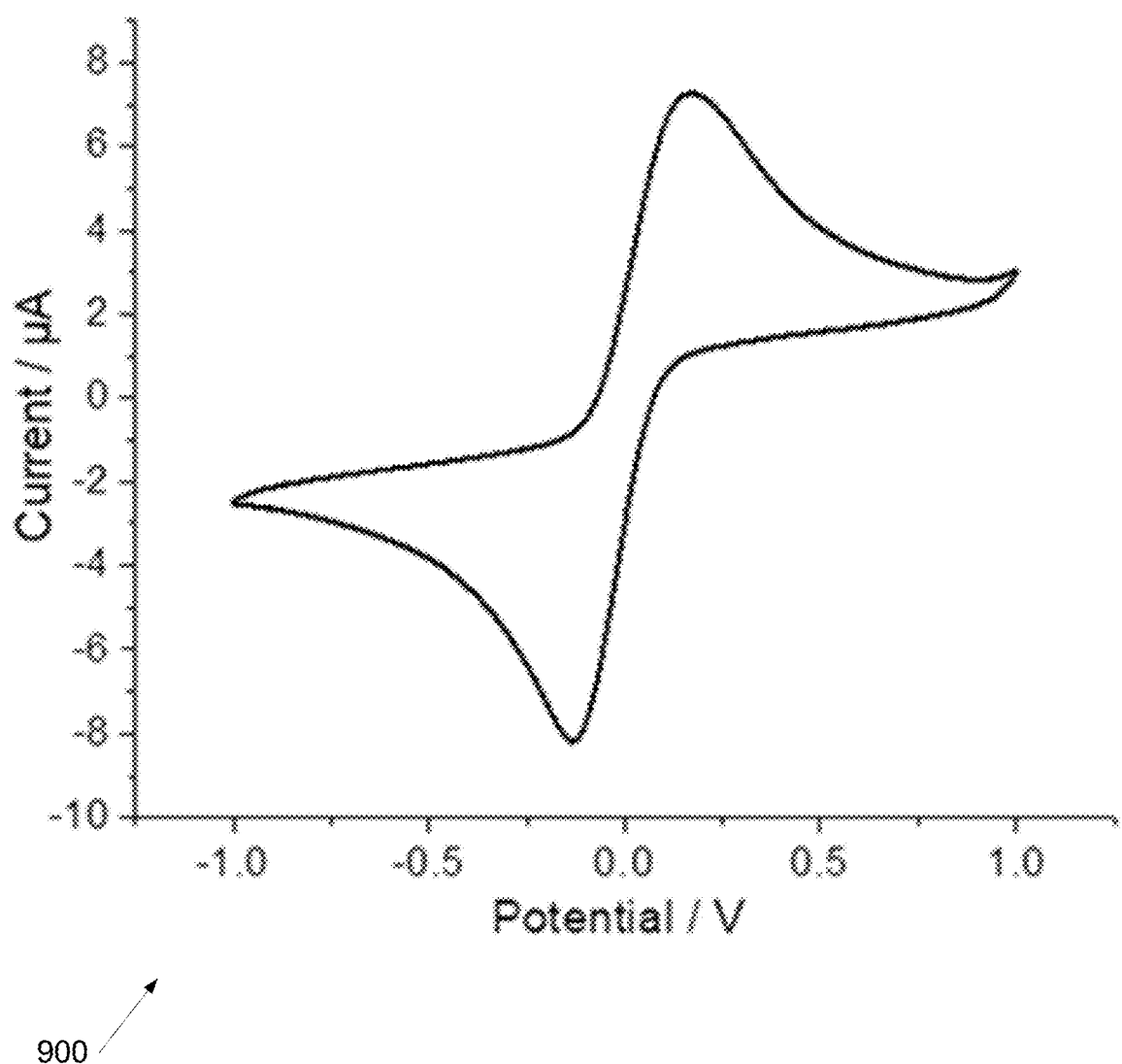
FIG. 9 is a graph illustrating cyclic voltammetry responses of a μFSE device in accordance with an embodiment of the invention.

A graph 900 illustrating cyclic voltammetry responses of a μFSE device in accordance with an embodiment of the invention is shown in FIG. 9. In some embodiments, cyclic voltammetry responses of the bare μFSE device made utilize 5 mM potassium hexacyanoferrate solution (in pH 7.4, 10 mM PBS). FIG. 9 shows the electrochemical activity of the electrodes inside of the μFSE device. This plot belongs to the hexacyanoferrate electrochemical response. It shows that the electrodes in the μFSE device work very well.

Figure 10:
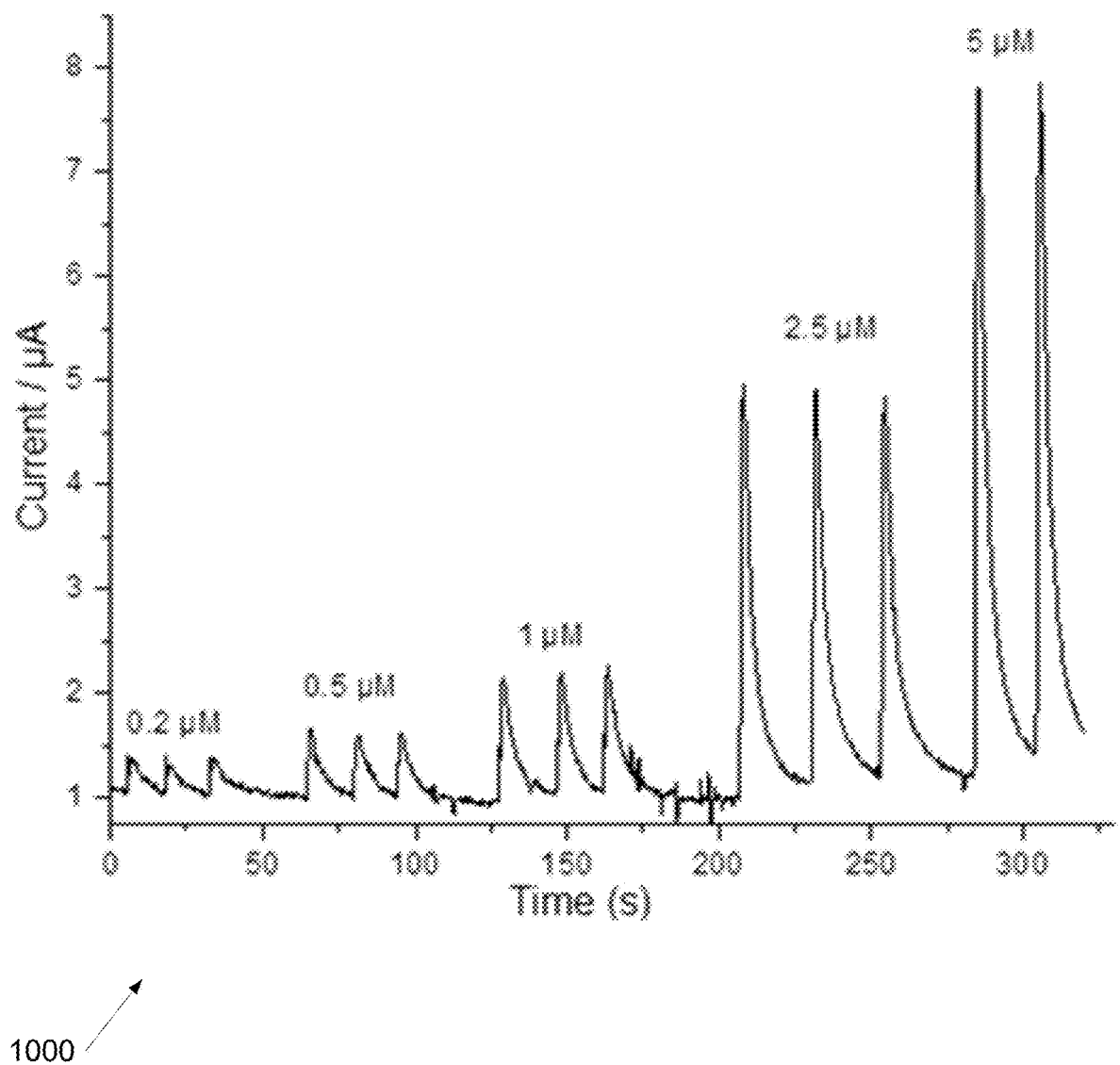
FIG. 10 is a graph illustrating flow injection amperometric current-time plots of three-successive injections of dopamine with different concentrations in accordance with an embodiment of the invention.

A graph 1000 illustrating flow injection amperometric current-time plots of three-successive injections of dopamine with different concentrations in accordance with an embodiment of the invention is shown in FIG. 10. The three-successive injections of dopamine with different concentrations may be applied having a carrier stream: pH 7.4 PBS applied potential: +200 mV; flow rate: 4 mL/min; sample loop: 3 μL; tubing length: 10 cm. FIG. 10 shows the electroanalytical application of the μFSE device toward different concentrations of dopamine solution. The results showed that the μFSE device can measure different concentration of dopamine in a solution with in the range of 0.2-6 μM.

Although specific materials and instrumentations and μSyringe fabrication processes are discussed above with respect to FIGS. 7-11B, any of a variety of materials and instrumentations and μSyringe fabrication processes as appropriate to the requirements of a specific application may be utilized in accordance with embodiments of the invention. Animal studies in accordance with embodiments of the invention are discussed further below.

Animal Studies

All experimental procedures were approved by the Institutional Animal Care and Use Committee of the University of California, Irvine, and were performed in compliance with national and institutional guidelines for the care and use of laboratory animals.

Monitoring DA Content in the Mouse CSF—Animals and Stereotaxic Surgery: Cannulation for Sampling of CSF from the Intracerebroventricular (ICV)). Stereotaxic surgery was carried out on eight weeks old Swiss Webster male mice (n=5) to implant a stainless steel guide cannula into the lateral ventricles (20 gauge guide cannulas with 2.5-mm custom-cut depth, PlasticsOne) (see FIG. 14A below). Animals were anesthetized with 2% isoflurane anesthesia (Institutional Animal Care and Use Committee guidelines). Animals were then secured in a Kopf stereotaxic instrument. A guide cannula was implanted at −0.22 mm posterior to bregma, 1.0 mm lateral, and 2.3 mm below the skull surface. Dental acrylic cement was used to fasten the cannula to the skull, and caps were inserted into the cannulas. Animals were allowed for one week of recovery.

To determine the kinetics of amphetamine-induced increase in locomotor activity, eight mice not subjected to cannulation may be used for the behavioral study. On the experiment day, four animals were injected intraperitoneally (IP) with amphetamine (1 mg/kg), and the control group (4 animals) were injected with saline (10 μl/gr). Animals' locomotor activities were monitored. Briefly, mice were placed into 40×40 cm2 locomotion test chambers (Med Associates, Fairfax, VT, USA), and allowed to habituate for 30 min before the test. The locomotor activities were recorded for 4 hours and analyzed using Activity Monitor 5 software (Med Associates).

Since the peak effect of amphetamine typically occurs 30 minutes after injection and diminishes at 2 hours after injection, the CSF samples from the lateral ventricle of mice subjected to cannulation may be collected at three time points: 0, 30, and 120 minutes after injection. The guide cannula may be connected to a PTFE tube connected to the syringe, and 3 μL of CSF may be collected at 2 hours of saline post-injection.

Figure 12A:
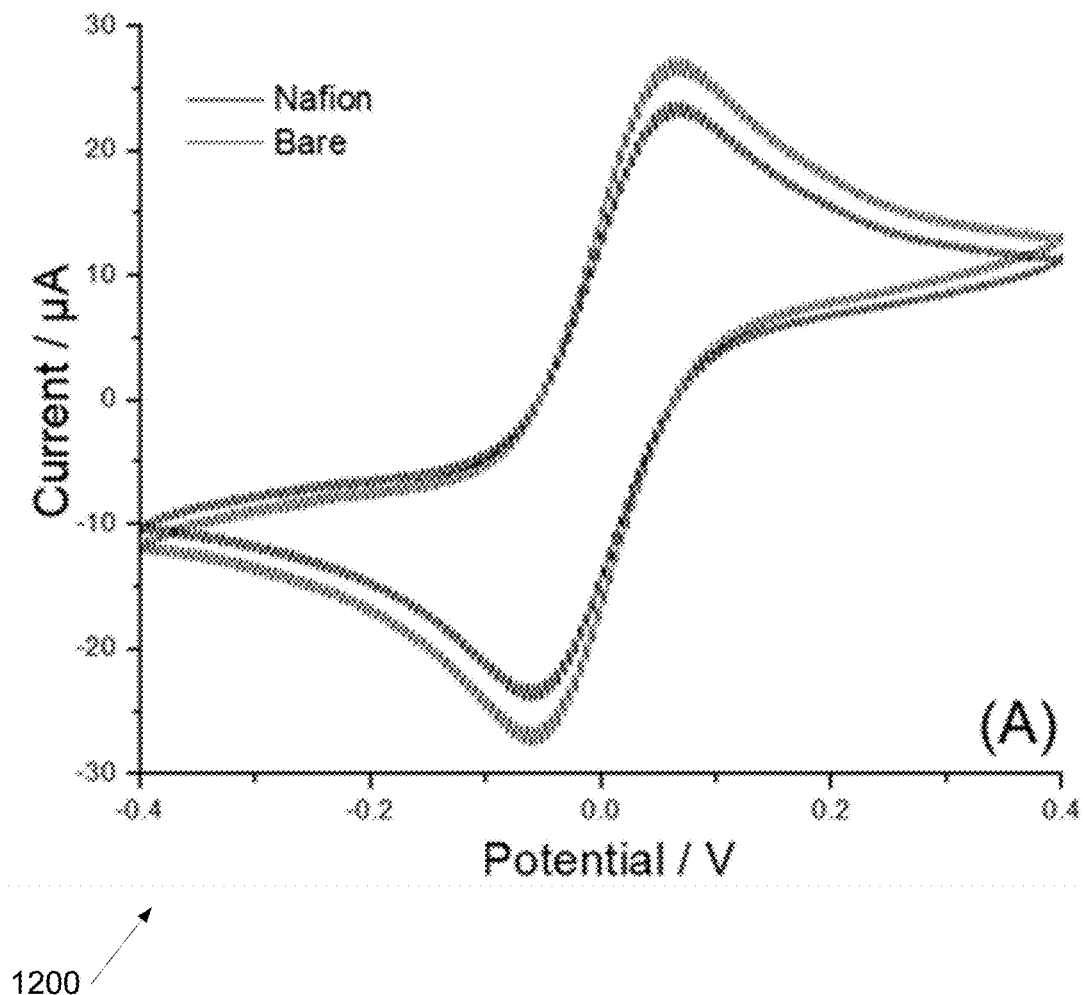
FIG. 12A is a graph illustrating a CV scan of an μSyringe recorded at 50 m/Vs in accordance with an embodiment of the invention.

Cyclic voltammetry may be employed to characterize the electrochemical performances of bare PG and Nafion-coated PG electrodes in μSyringe for the fabrication of dopamine biosensors. A graph 1200 illustrating a CV scan of an μSyringe recorded at 50 m/Vs in accordance with an embodiment of the invention is shown in FIG. 12A. FIG. 12A shows the CV obtained at bare-PGE and Nafion coated PGE at a scan-rate of 50 mV/s in 5 mM $K_4Fe(CN)_6/K_3Fe(CN)_6$ (1:1 ratio) solution containing 0.1 M KCl. In some embodiments, it may be observed that the current corresponding to the oxidation at the bare PG electrode (27 μA) may be higher as compared to that of the Nafion coated PG electrode (23 μA), confirming the successful coating of Nafion on the PGE surface in the μSyringe.

Figure 12B:
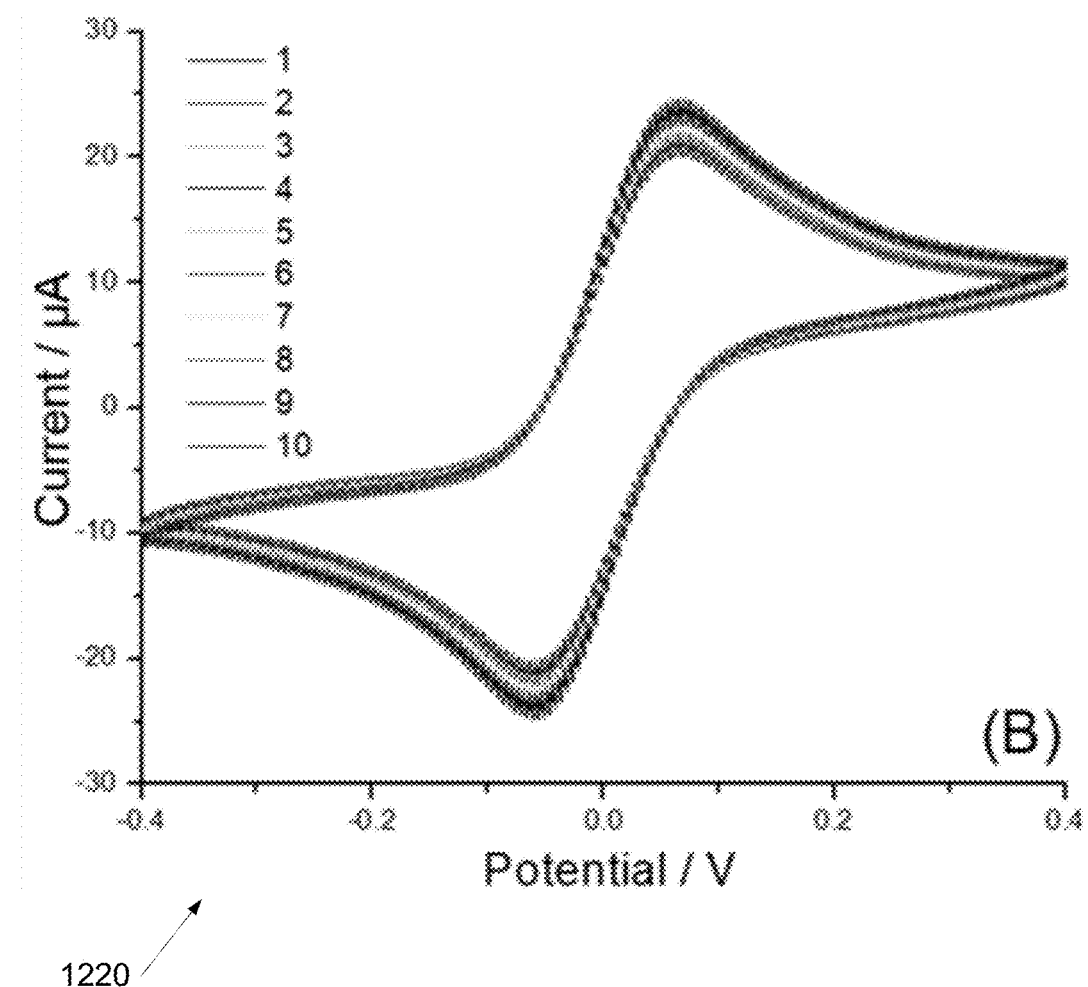
FIG. 12B is a graph illustrating CV plots obtained from 8 different μSyringes in accordance with an embodiment of the invention.

The reproducibility of the fabrication processes for the μSyringe sensing devices was investigated by using 8 randomly selected μSyringes. A graph 1220 illustrating CV plots obtained from 8 different μSyringes in accordance with an embodiment of the invention is shown in FIG. 12B. FIG. 12B shows the CV plot of the μSyringe sensors recorded in ferri-ferrocyanide solution with a scan rate of 50 mV/s, where well-defined oxidation-reduction peaks for all electrodes were observed. The inset of FIG. 12B shows the comparison of the current peak values of 8 different electrodes with a current peak value of 7.4±0.4 μA (4.3% standard deviation). These results showed that the μSyringe sensors' fabrication process is highly reproducible, and μSyringe sensors may be fabricated with almost identical electrochemical properties.

Figure 12C:
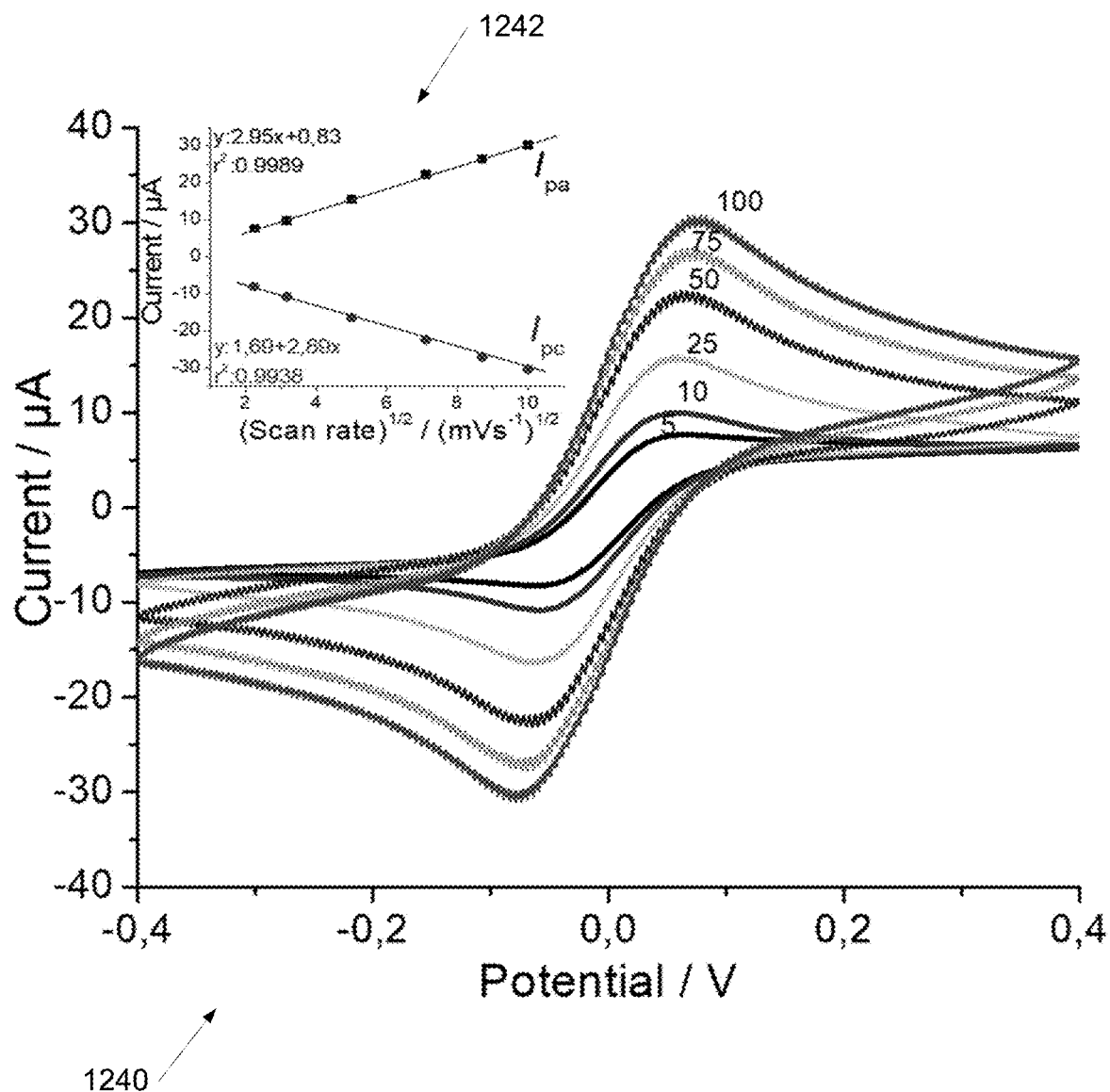
FIG. 12C is a graph illustrating effect of change in the scan rate from 5 to 100 m/Vs on the current response of a μSyringe in accordance with an embodiment of the invention.

A graph 1240 illustrating effect of change in the scan rate from 5 to 100 m/Vs on the current response of a μSyringe in accordance with an embodiment of the invention is shown in FIG. 12C. In FIG. 12C, the effect of different scan rates on the cyclic voltammograms of the PG electrode in 5 mM $K_4Fe(CN)_6/K_3Fe(CN)_6$ (1:1 ratio) solution containing 0.1 M KCl was investigated. FIG. 12C illustrates the effect of change in the scan rate from 5 to 100 m/Vs on the current response of μSyringe with the inset graph 1242 showing current versus square root of scan rate potential. It can be seen that with the increase of scan rate (10-100 mV/s), the redox peak currents of ferrocyanide increase (see inset of FIG. 12C). The equation of $I=(-2.29±3.47)+(1.65±0.05)v$ ($R^2=0.9993$) indicates the linear relationship between the oxidation peak current of ferrocyanide and scan rate (v). In many embodiments, the electrochemical oxidation reaction of ferrocyanide is an adsorption-controlled process.

Figure 12D:
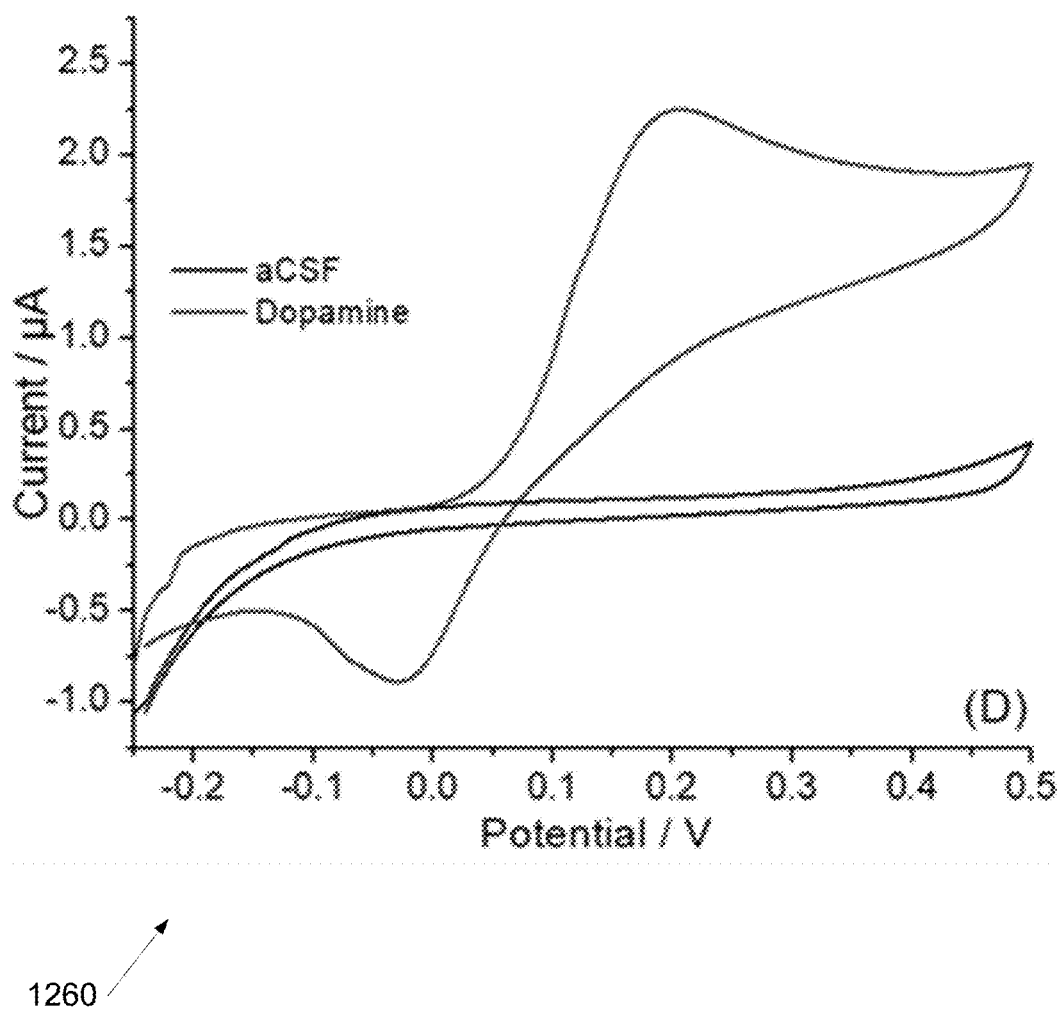
FIG. 12D is a graph illustrating CV plots of a μSyringe sensing device in the absence of DA when using aCSF and presence of 500 nM DA recorded in aCSF in accordance with an embodiment of the invention.

A graph 1260 illustrating CV plots of a μSyringe sensing device in the absence of DA when using aCSF and presence of 500 nM DA recorded in aCSF in accordance with an embodiment of the invention is shown in FIG. 12D. The cyclic voltammogram of DA was recorded in μSyringe at pH 7.4 at a scan rate of 50 mV/s. In reference to FIG. 12D, the CV plots of the μSyringe sensing device in the absence of DA when using aCSF (black line) and presence of 500 nM DA recorded in aCSF (red line) are illustrated. The oxidation peak potential of DA is located at ~0.2.

Figure 13A:
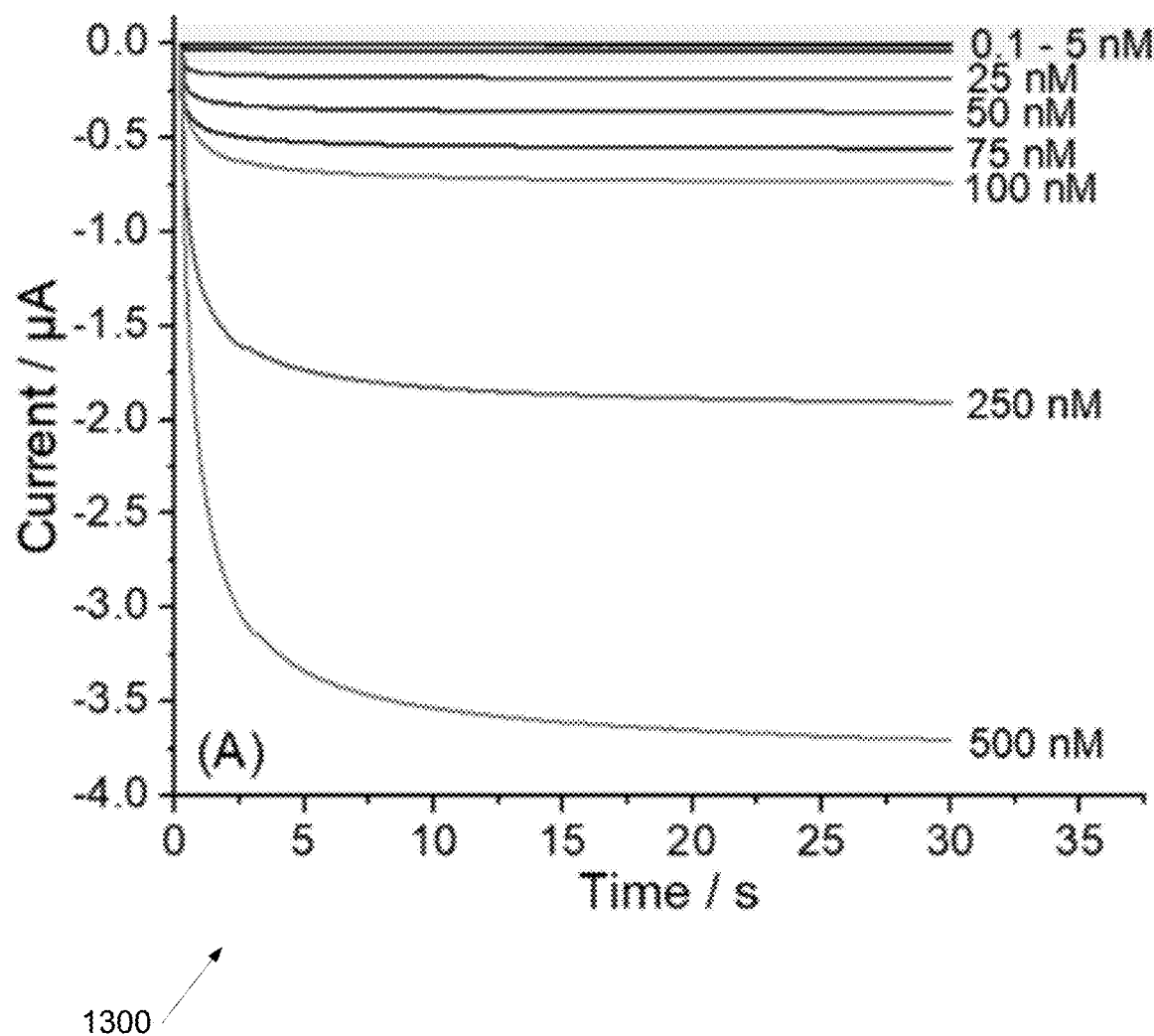
FIG. 13A is a graph illustrating amperometric curve obtained with DA concentrations ranging from 0.1 to 500 nM in accordance with an embodiment of the invention.
Figure 13B:
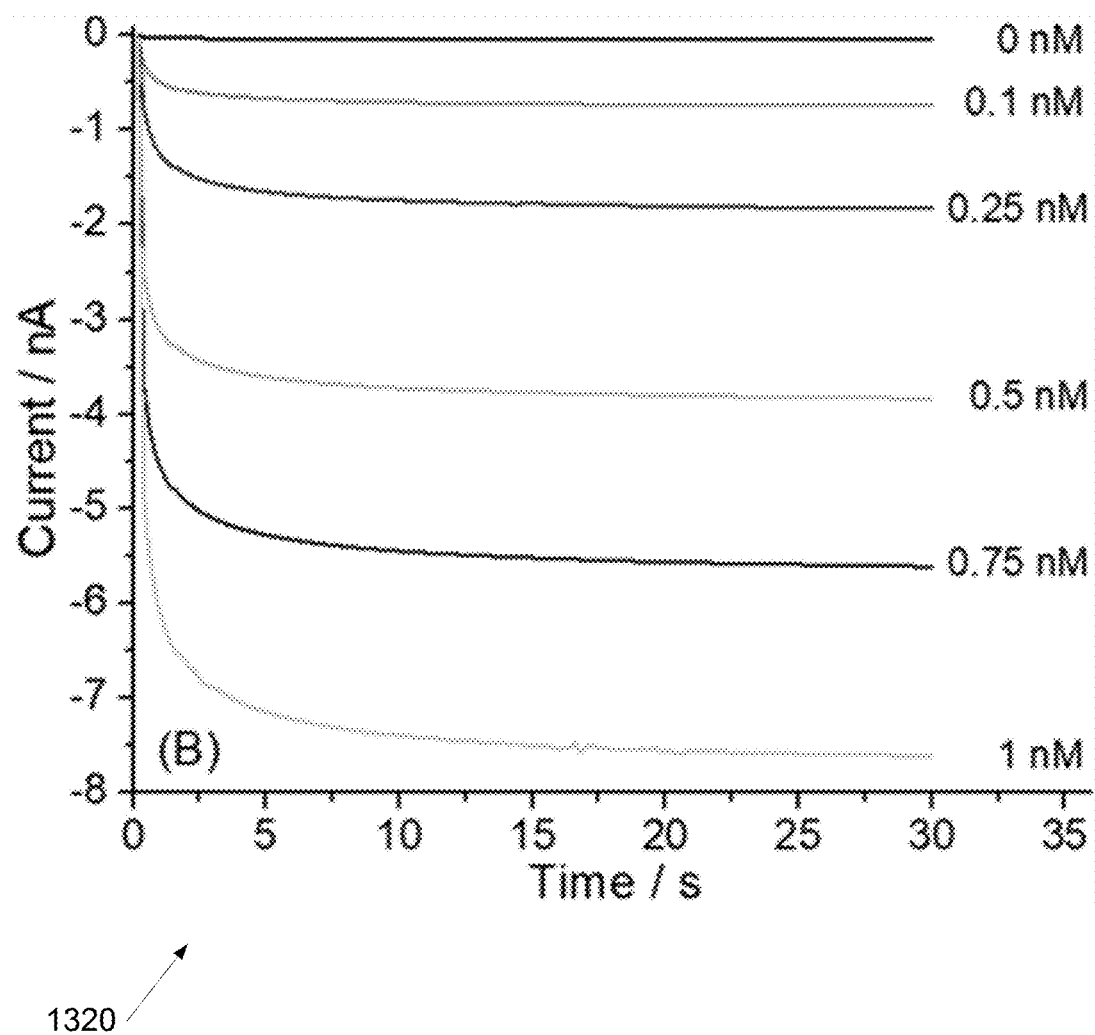
FIG. 13B is a graph illustrating an amperometric plot of the lower DA concentrations as zoomed-in parts of the previous plots in FIG. 13A in accordance with an embodiment of the invention.

A graph 1300 illustrating amperometric curve obtained with DA concentrations ranging from 0.1 to 500 nM in accordance with an embodiment of the invention is shown in FIG. 13A. A graph 1320 illustrating an amperometric plot of the lower DA concentrations as zoomed-in parts of the previous plots in FIG. 13A in accordance with an embodiment of the invention is shown in FIG. 13B. In various embodiments, the amperometric response kinetics of μSyringe sensing device may be characterized at an increasing concentration of dopamine (0.1-500 nM) in the aCSF, as shown in FIGS. 13A-B. The complete amperometric curve plot is shown on the left-hand side of FIG. 13B, where the right-hand side of FIG. 13B shows the amperometric plot of the lower DA concentrations as zoomed-in parts of the previous plots.

Figure 13C:
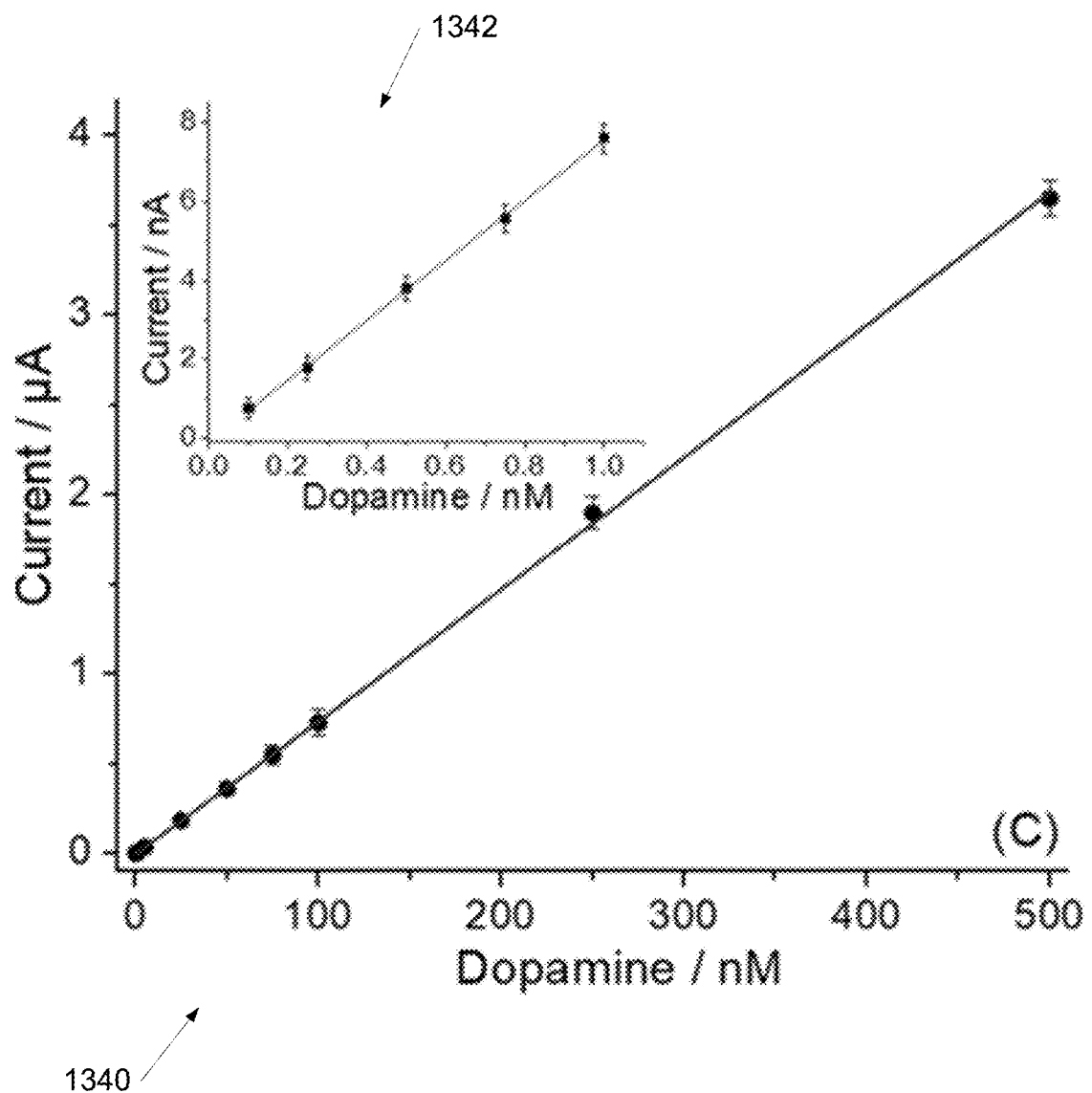
FIG. 13C is a graph illustrating a calibration plot obtained with an inset showing the DA concentration in accordance with an embodiment of the invention.
Figure 13D:
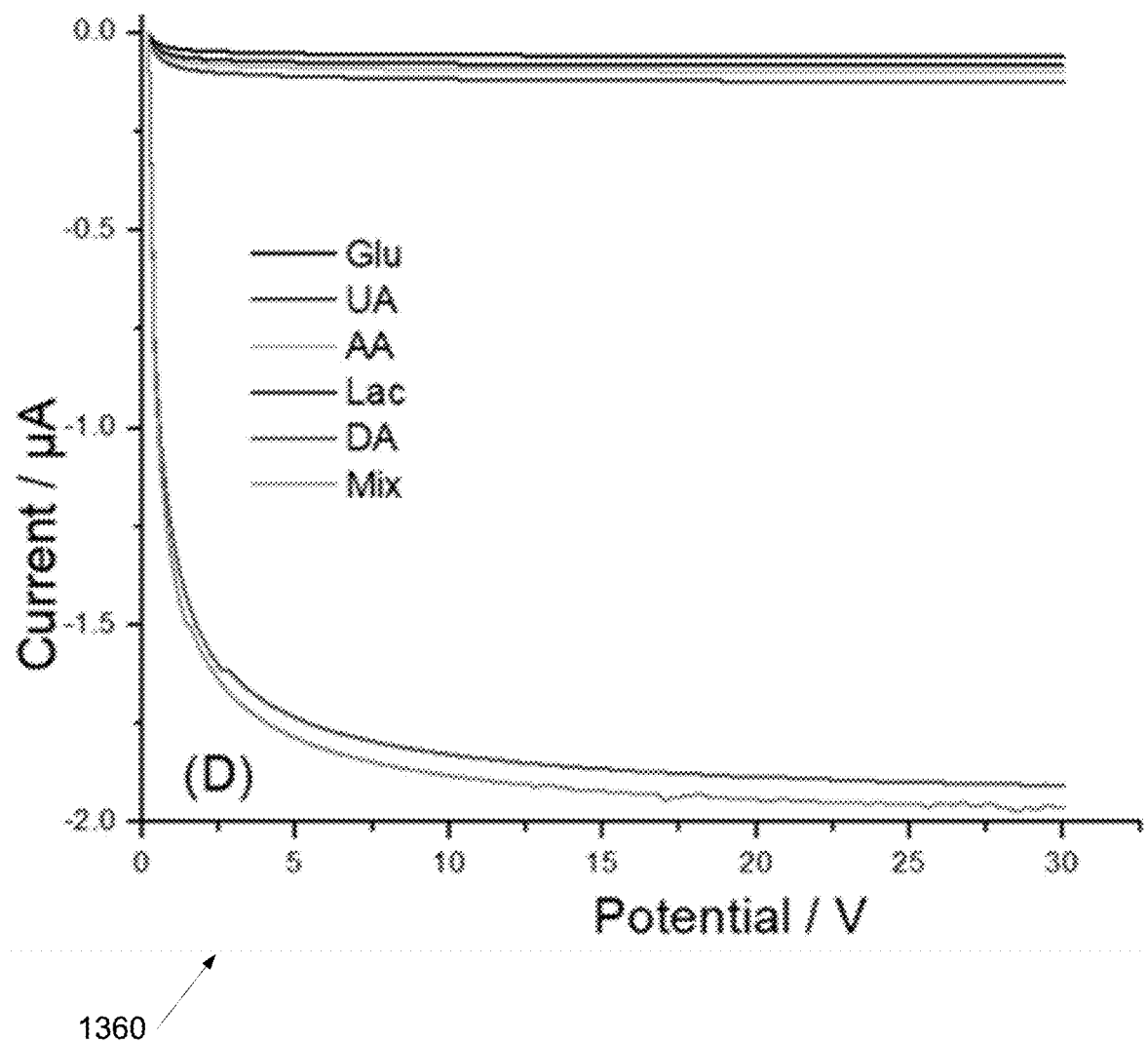
FIG. 13D is a graph illustrating selectivity testing of a μSyringe sensing device in accordance with an embodiment of the invention.

A graph 1340 illustrating a calibration plot obtained with an inset 1342 showing the DA concentration in accordance with an embodiment of the invention is shown in FIG. 13C. In reference to FIG. 13C, the calibration plot may be obtained with an inset showing the DA concentration. Error bars show the standard deviation of three data sets. A graph 1360 illustrating selectivity testing of a μSyringe sensing device in accordance with an embodiment of the invention is shown in FIG. 13D. In reference to FIG. 13D, selectivity testing of the μSyringe sensing device may be conducted using 5 mM glucose (Gl), 5 mM lactate (La), 20 μM uric acid (UA), or 20 μM ascorbic acid (AA), and as a positive control 500 nM DA or mixed solution composed of all aforementioned tested interferons with DA at the indicated concentrations.

FIGS. 13A, 13B, and 13C show that the peak currents of the amperometric response of DA were linearly related to its concentrations. In many embodiments, the μSyringe sensing device responded very quickly and reached a steady-state within 5-10 s. In some embodiments, a linear dynamic range of 0.1 nM to 0.5 μM with a linear correlation coefficient of 0.9991 and a calculated limit of detection of 0.62 nM DA may be observed (the linear equation was Ip(μA)=0.008 C (mM)+1.53×10$^{-5}$). In some embodiments, DA response may be linear in the concentration range of 0.1 to 1 nM with a detection limit of 0.1 nM may be calculated based on S/N of 3, and the linear equation was Ip(μA)=2C (mM)+6.18, with the linear correlation coefficient $R^2$ was 0.9993.

The interference mitigation capability of the μSyringe for the detection of DA in the presence of various compounds (5 mM glucose (Gl), 5 mM lactate (La), 20 μM uric acid (UA), or 20 μM ascorbic acid (AA), and as a positive control 500 nM DA) was investigated by using amperometric analysis. The results in FIG. 13D showed no significant changes in the peak currents for the above interferent compounds. Therefore, the μSyringe sensor may be a promising candidate for the analysis of DA, showing no significant effects of interferences from other compounds.

Figure 14A:
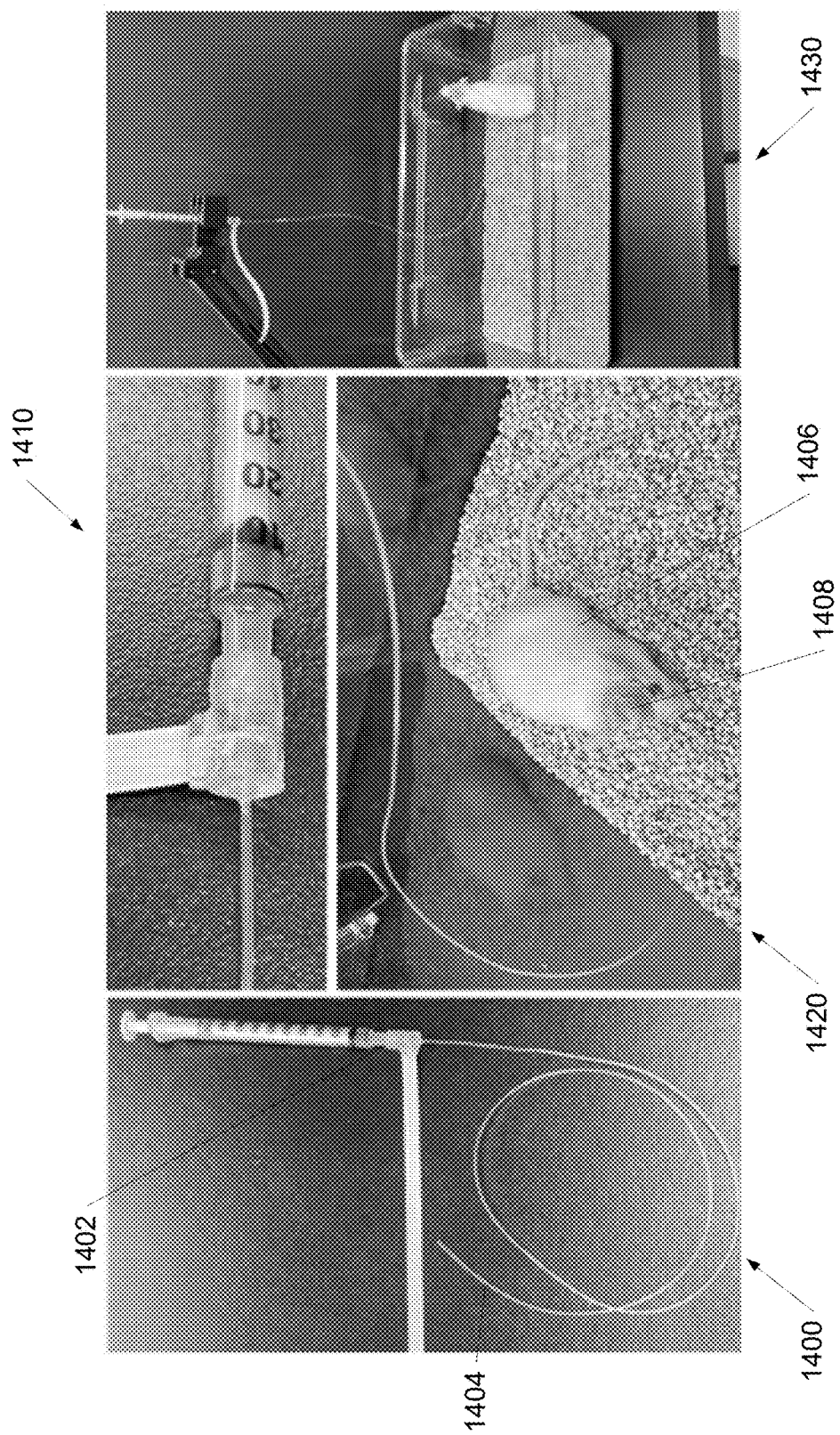
FIG. 14A are images illustrating real sample analysis of a μSyringe sensing device in accordance with an embodiment of the invention.
Figure 14B:
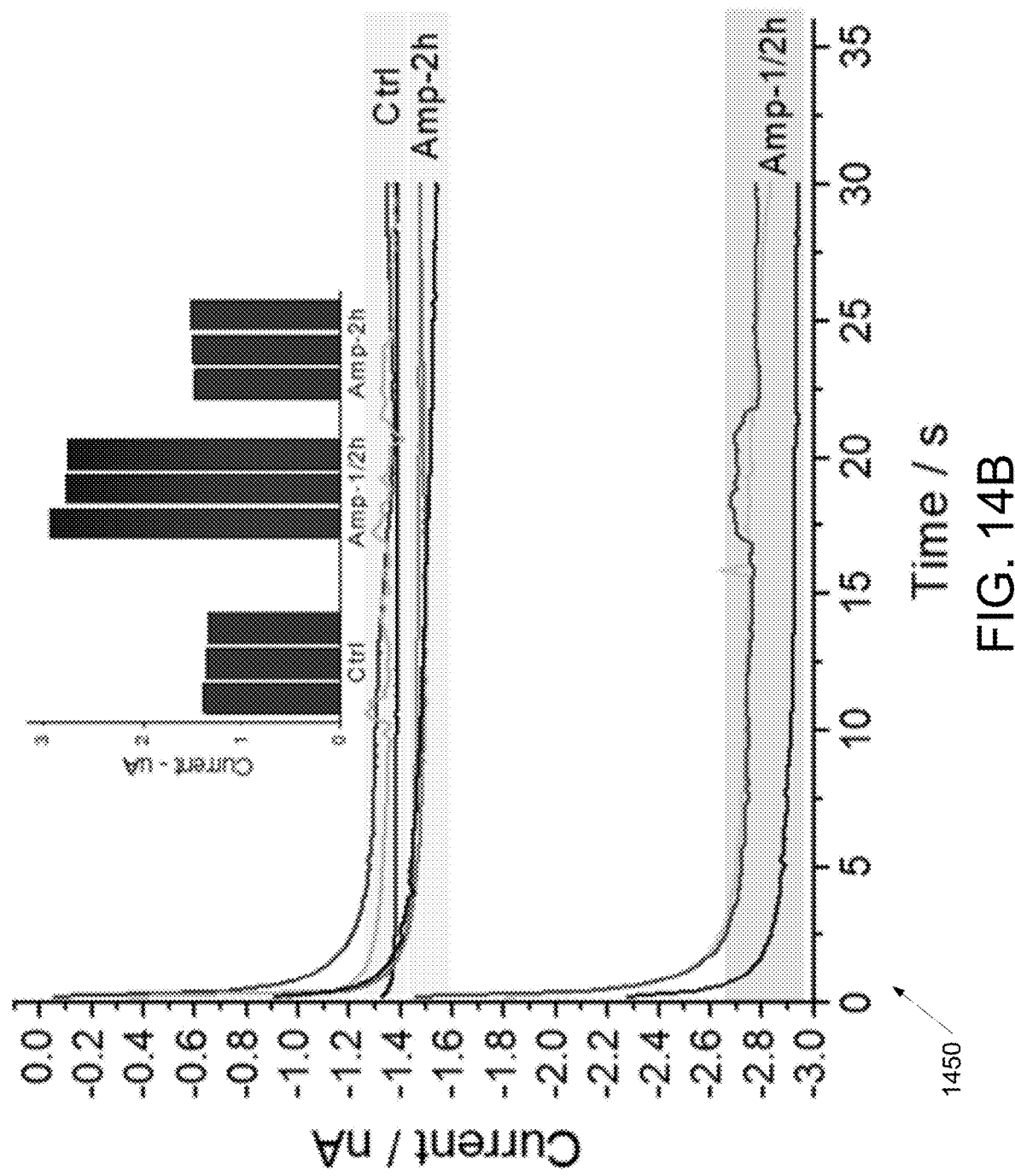
FIG. 14B is a graph illustrating DA concentration measured by a μSyringe sensing device in the CSF of three study groups in the control and amphetamine-treated mice at different time points in accordance with an embodiment of the invention.

To investigate its capability to analyze real-time samples, the μSyringe sensing device was employed to monitor DA concentrations in CSF samples from the brains of freely moving mice. As seen in FIG. 14A, images 1400, 1410, 1420, and 1430, show the μSyringe sensing device 1402 with PTFE tube 1404 fixed on a stand and the end of the tube may be inserted/fixed into the mouse brain 1406 with a cannula 1408. Images 1400, 1410, 1420, and 1430 illustrate real sample analysis of the μSyringe sensing device 1402 in accordance with an embodiment of the invention. Images 1420 and 1440 of FIG. 14A show pictures of a μSyringe sensing device 1402, mouse 1406 after the insertion of a guide cannula 1408 for CSF extraction and connection of μSyringe sensing device to the animal. A graph 1450 illustrating DA concentration measured by a μSyringe sensing device in the CSF of three study groups in the control and amphetamine-treated mice at different time points in accordance with an embodiment of the invention is shown in FIG. 14B. In various embodiments, CSF samples were manually performed. The results indicate the accuracy of the biosensor in determining the DA content in real samples.

Although specific animal studies and results are discussed above with respect to FIGS. 12A-14B, any of a variety of studies and results as appropriate to the requirements of a specific application may be utilized in accordance with embodiments of the invention. Processes for fabricating microfluidic devices in accordance with embodiments of the invention are further described below.

Fabrication Processes

Figure 15:
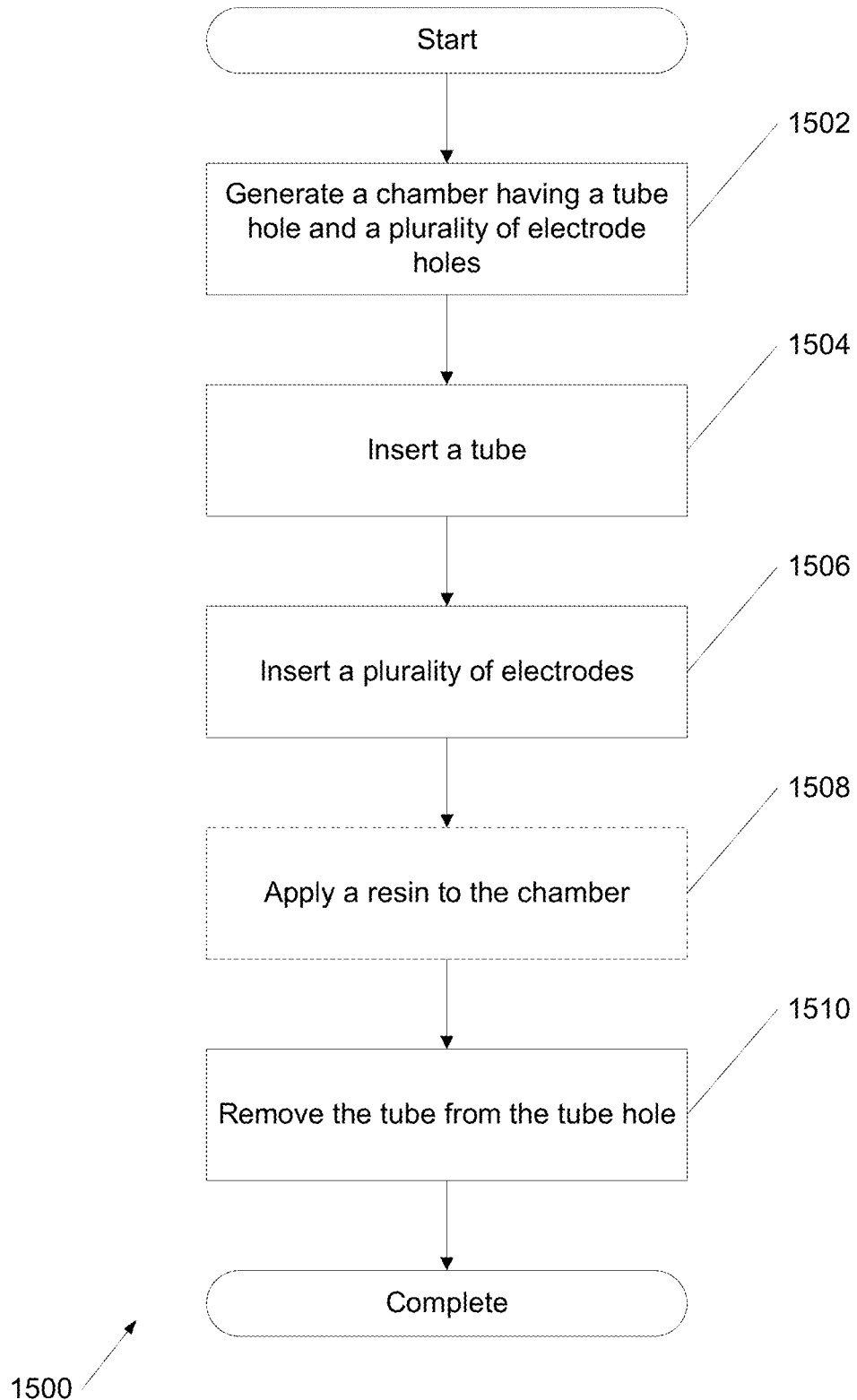
FIG. 15 is a flowchart illustrating a process for fabrication of microfluidic devices (e.g., μFSE device and/or μSyringe sensing device) in accordance with an embodiment of the invention.

Processes for fabrication of microfluidic devices (e.g., μFSE device and/or μSyringe sensing device) are described above. Additional fabrication processes are provided below. A flowchart illustrating a process for fabrication of microfluidic devices in accordance with an embodiment of the invention are shown in FIG. 15. The process 1500 may include generating (1502) a chamber having a tube hole and a plurality of electrode holes, as further described above. In many embodiments, the chamber may be generated (1502) using a 3D printing process (e.g., 3D sterolithography), as further described above. In some embodiments, the tube hole may be configured to receive a tube, as further described above. In some embodiments, the tube hole may extend from a first end of the chamber to a second end of the chamber. In some embodiments (e.g., μSyringe sensing device), the tube hole may extend from a first end of the chamber to a syringe connection hole. Further, the plurality of electrode holes may be configured to receive a plurality of electrodes, as further described above. In some embodiments, each of the plurality of electrode holes may be in contact with the tube, as further described above.

In reference to FIG. 15, the process 1500 may also include inserting (1504) the tube into the tube hole and inserting (1506) a plurality of electrodes into the plurality of electrode holes, as further described above. In some embodiments, the plurality of electrode holes may be a singular hole and the plurality of electrodes may be a singular unit. In such embodiments, the singular unit of electrodes may be inserted (1506) in the singular electrode hole. One of ordinary skill will appreciate that the configuration may be changed without changing the scope of the invention. In some embodiments, the process 1500 may also include applying (1508) a resin to the chamber, as further described above. In some embodiments, the resin may be a clear epoxy resin. In some embodiments, the chamber may also include a first resin filling zone located at the first end of the chamber and the resin may be applied via the first resin zone. In some embodiments, the chamber may also include a second resin filling zone located at the second end of the chamber and the resin may be applied via the second resin zone. In many embodiments, applying (1508) the resin may create a strong inner area for the plurality of electrodes. Further, the process 1500 may also include removing (1510) the tube from the tube hole. In many embodiments, removing (1510) the tube from the tube hole may expose a sensing zone that allows the plurality of electrodes to be in contact with a fluid for analysis, as further described above.

Figure 16:
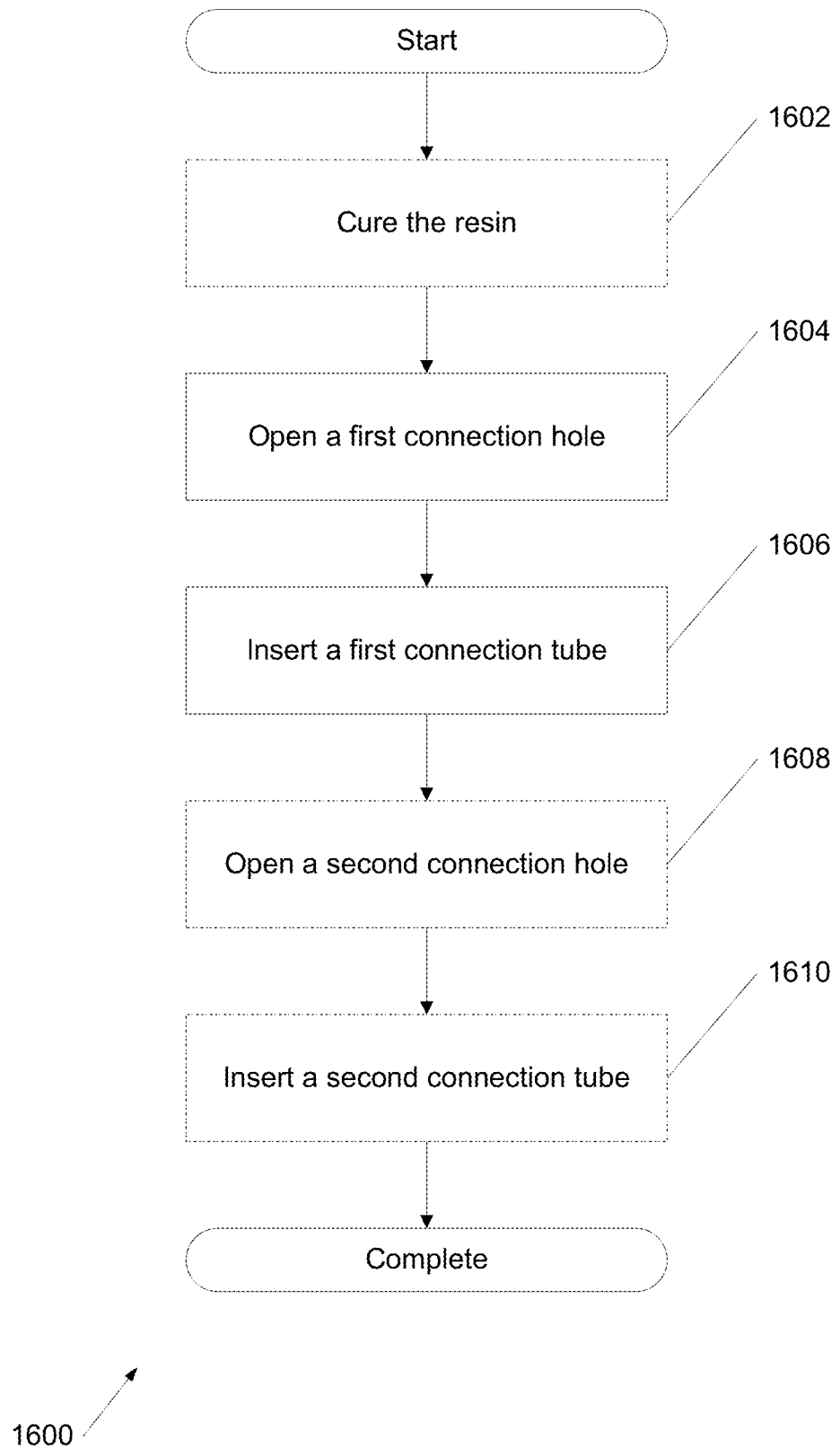
FIG. 16 is flowchart illustrating another process for fabrication of microfluidic devices in accordance with an embodiment of the invention.

A flowchart illustrating another process for fabrication of microfluidic devices in accordance with an embodiment of the invention is shown in FIG. 16. In some embodiments, the process 1600 may be in addition to process 1500. In some embodiments, the process 1600 may include curing (1602) resin applied to the chamber, as further described above. In some embodiments, the resin may be cured (1602) before removing the tube from the tube hole, as further described above. The process 1600 may also include opening (1604) a first connection hole on the first end of the chamber and inserting (1606) a first connection tube into the first connection hole, as further described above. In some embodiments, the first connection tube may be connected to a subject (e.g., via a guide cannula) and a syringe may be connected to the other side (e.g., the second end of the chamber) to draw fluid from the subject causing the fluid to flow across the sensing zone. In some embodiments, process 1600 may also include opening (1608) a second connection hole on the second end of the chamber and inserting (1610) a second connection tube into the second connection hole, as further described above. In some embodiments, a pump may be attached to either the first connection tube or the second connection tube to provide mechanical pressure to flow the fluid across the sensing zone.

Although specific process for fabrication of microfluidic sensing electrode devices are discussed above with respect to FIGS. 15-16, any of a variety of processes for fabrication as appropriate to the requirements of a specific application may be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method for fabrication of a microfluidic sensing electrode (µFSE) device for detection of analyte(s) in a fluid, the method comprising:
   generating a chamber comprising:
      a tube hole configured to receive a tube, wherein the tube hole extends from a first end of the chamber to a second end of the chamber;
      a plurality of electrode holes configured to receive a plurality of electrodes, wherein each of the plurality of electrode holes is in contact with the tube hole;
      a first resin fill zone located at the first end of the chamber; and
      a second resin fill zone located at the second end of the chamber;
   inserting the tube into the tube hole;
   inserting the plurality of electrodes into the plurality of electrode holes;
   applying a resin to the chamber, wherein the inserted tube seals the tube hole when applying the resin to the chamber, wherein the inserted tube seals the first resin fill zone and the second resin fill zone so that the first resin fill zone and second resin fill zone are not in fluid communication with each other when applying the resin to the chamber, and wherein each of the plurality of electrode holes is in contact with the tube when applying the resin to the chamber; and
   removing the tube from the tube hole, wherein each of the plurality of electrode holes is in contact with the tube hole after removing the tube from the tube hole and wherein removing the tube from the tube hole exposes a sensing zone that allows the plurality of electrodes to be in contact with the fluid.

2. The method of claim 1 further comprising curing the resin before removing the tube from the tube hole.

3. The method of claim 1, wherein the resin is a clear epoxy resin.

4. The method of claim 1, wherein the resin is applied via the first resin fill zone.

5. The method of claim 4, wherein the resin is applied via the second resin fill zone.

6. The method of claim 4 further comprising opening a first connection hole on the first end of the chamber.

7. The method of claim 6 further comprising inserting a first connection tube into the first connection hole.

8. The method of claim 7 further comprising opening a second connection hole on the second end of the chamber.

9. The method of claim 8 further comprising inserting a second connection tube into the second connection hole.

10. The method of claim 9, wherein the first connection tube and the second connection tube have inner diameters of 100 µm and outer diameters of 400 µm.

11. The method of claim 1, wherein the tube has an inner diameter of 100 µm and an outer diameter of 400 µm.

12. The method of claim 1, wherein the sensing zone has an inner diameter of 400 µm.

13. The method of claim 1, wherein the µFSE device comprises an inner electroactive sensor volume of about 0.5 µL.

14. The method of claim 1, wherein the chamber is generated using a 3D printing process.

15. The method of claim 14, wherein the 3D printing process is 3D stereolithography.

16. The method of claim 1, wherein the plurality of electrode holes comprises a first electrode hole, a second electrode hole, and a third electrode hole.

17. The method of claim 16, wherein the plurality of electrodes comprises a reference electrode, a working electrode, and a counter electrode.

18. The method of claim 16, wherein the plurality of electrodes comprises three pencil graphite rods.

19. The method of claim 16, wherein the plurality of electrodes comprises three metal rods.

20. The method of claim 19, wherein the three metal rods comprises a first rod made with Au, a second rod made with Pt, and a third rod made with Ag.

* * * * *